(12) United States Patent
Zhu et al.

(10) Patent No.: US 10,993,236 B2
(45) Date of Patent: Apr. 27, 2021

(54) SYNCHRONIZATION SIGNAL MEASUREMENT FOR BEAM DETECTION

(71) Applicant: QUALCOMM Incorporated, San Diego, CA (US)

(72) Inventors: Jun Zhu, San Diego, CA (US); Yong Li, San Diego, CA (US); Raghu Narayan Challa, San Diego, CA (US); Andrea Garavaglia, Nuremberg (DE); Yongle Wu, San Diego, CA (US); Ting Kong, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/702,316

(22) Filed: Dec. 3, 2019

(65) Prior Publication Data

US 2020/0187185 A1 Jun. 11, 2020

Related U.S. Application Data

(60) Provisional application No. 62/775,698, filed on Dec. 5, 2018.

(51) Int. Cl.
*H04W 72/04* (2009.01)
*H04J 11/00* (2006.01)
*H04B 17/327* (2015.01)
*H04W 56/00* (2009.01)

(52) U.S. Cl.
CPC ........ *H04W 72/046* (2013.01); *H04B 17/327* (2015.01); *H04J 11/0073* (2013.01);
(Continued)

(58) Field of Classification Search
CPC ................ H04W 72/046; H04B 17/327; H04J 11/0073; H04J 11/0076; H04J 11/0079
See application file for complete search history.

(56) References Cited

U.S. PATENT DOCUMENTS 10,447,375 B1\* 10/2019 Padhy .................... H04B 7/088
2018/0302819 A1 10/2018 Lee et al.
(Continued)

FOREIGN PATENT DOCUMENTS

WO WO-2018068723 A1 4/2018
WO WO-2018128218 A1 7/2018

OTHER PUBLICATIONS

CATT: "SS-block Time Index Indication," 3GPP Draft, 3GPP TSG RAN WG1 NR Ad Hoc#2 , R1-1710024_NR _SS Block Index, 3rd Generation Partnership Project (3GPP), Mobile Competence Centre, 650, Route Des Lucioles, F-06921, Sophia-Antipolis Cedex, France, vol. RAN WG1, No. Qingdao, China; Jun. 27, 2017-Jun. 30, 2017, Jun. 26, 2017 (Jun. 26, 2017), XP051299249, 3 pages, Retrieved from the Internet: URL: http://www.3gpp.org/ftp/Meetings_ 3GPP_SYNC/RAN1/Docs/ [retrieved on Jun. 26, 2017], the whole document.
(Continued)

*Primary Examiner* — Jaison Joseph

(57) ABSTRACT

Methods, systems, and devices for wireless communications are described. A user equipment (UE) may use a measurement procedure for beam detection within an existing cell. The UE perform a search procedure for a first synchronization signal block (SSB) to detect a first beam of a base station. The UE may determine a first timing offset for the first SSB based on the search procedure. The UE may estimate a second timing offset for a second SSB from the base station based on the first timing offset. The UE may perform a measurement procedure for the second SSB to detect a second beam of the base station based on the second
(Continued)

timing offset. The UE may prune fake beams based on synchronization signals used for the measurement procedure.

26 Claims, 14 Drawing Sheets

(52) U.S. Cl.
CPC ....... *H04J 11/0076* (2013.01); *H04J 11/0079* (2013.01); *H04W 56/0095* (2013.01)

(56) References Cited

U.S. PATENT DOCUMENTS

| | | | |
|---|---|---|---|
| 2018/0302889 A1* | 10/2018 | Guo | H04B 7/088 |
| 2020/0021336 A1* | 1/2020 | Da Silva | H04B 7/0626 |

OTHER PUBLICATIONS

Partial International Search Report—PCT/US2019/064399—ISA/EPO—dated Feb. 25, 2020.

Huawei, et al., "Discussion on L1-RRSP Measurements for Candidates Beam Detection and Beam Management", 3GPP Draft, 3GPP TSG-RAN WG4 Meeting #88, R4-1810684, 3rd Generation Partnership Project (3GPP), Mobile Competence Centre, 650, Route Des Lucioles, F-06921 Sophia-Antipolis Cedex, France, vol. RAN WG4, No. Goteborg, Sweden, Aug. 20, 2018-Aug. 24, 2018, Aug. 10, 2018 (Aug. 10, 2018), XP051579613, 3 pages, Retrieved from the Internet: URL: http://www.3gpp.org/ftp/tsg%5Fran/WG4%5FRadio/TSGR4%5F88/Docs/R4%2D1810684%2Ezip, [retrieved on Aug. 10, 2018], Section 2.1.

International Search Report and Written Opinion—PCT/US2019/064399— ISAEPO—May 7, 2020.

* cited by examiner

SYNCHRONIZATION SIGNAL
MEASUREMENT FOR BEAM DETECTION

CROSS REFERENCE

The present application for patent claims the benefit of U.S. Provisional Patent Application No. 62/775,698 by ZHU, et al., entitled "SYNCHRONIZATION SIGNAL MEASUREMENT FOR BEAM DETECTION," filed Dec. 5, 2018, assigned to the assignee hereof, and expressly incorporated herein.

BACKGROUND

The following relates generally to wireless communications, and more specifically to synchronization signal measurement for beam detection.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may perform a search procedure to connect to a base station. The UE may monitor for and measure synchronization signals from a base station. Once connected, the UE may also search for new beams of the base station. Conventional techniques, however, for finding new beams of a connected cell can be improved.

SUMMARY

The described techniques relate to improved methods, systems, devices, and apparatuses that support synchronization signal measurement for beam detection. Generally, the described techniques provide for a user equipment (UE) to employ measurement procedures to detect new beams. The UE and base station may be configured for beamformed transmissions. The base station may periodically transmit synchronization signals in a synchronization signal block (SSB), which the UE may monitor for and measure when connecting to the cell. An SSB may include a primary synchronization signal (PSS), a physical broadcast channel (PBCH), and a secondary synchronization signal (SSS).

The UE may perform a search procedure to detect new cells. As part of the search procedure, the UE may measure reference signals in the PSS, PBCH, and SSS of an SSB to receive accurate timing and synchronization information for the cell. Once connected with the cell, the UE may track the status and quality of its established beams with a measurement procedure that measures reference signals in just the SSS of an SSB. After new cells are detected, the UE may still detect new beams in existing cells. Some UEs may perform a search procedure to detect new beams, but the search procedure may consume a lot of power at the UE.

A UE described herein may use a measurement procedure for beam detection. The measurement procedure, which uses fewer synchronization signals, may result in less power consumption at the UE. The UE may perform a search procedure to detect a first SSB from the base station. The UE may determine a first timing offset (TO) for the first SSB based on the search procedure and use the first TO for the first SSB to estimate other TOs for other SSBs. The UE may use the TOs for the other SSBs to perform measurement procedures. In some cases, a beam detected by a measurement procedure may have a strong reference signal received power (RSRP). However, if the base station beam has a weak signal to noise ratio (SNR), the base station beam may suffer from strong interference. A beam with high RSRP but low SNR may be referred to as a fake beam. Therefore, the UE may implement techniques to distinguish a fake beam from a valid beam, even if the valid beam has a weak signal. For example, the UE may prune fake beams by measuring SNR of an SSS of the measured SSB.

A method of wireless communications at a UE is described. The method may include performing a search procedure for a first SSB to detect a first beam of a base station, determining a first TO for the first SSB based on the search procedure, estimating a second TO for a second SSB from the base station based on the first TO, and performing a measurement procedure for the second SSB to detect a second beam of the base station based on the second TO.

An apparatus for wireless communications at a UE is described. The apparatus may include a processor, memory in electronic communication with the processor, and instructions stored in the memory. The instructions may be executable by the processor to cause the apparatus to perform a search procedure for a first SSB to detect a first beam of a base station, determine a first TO for the first SSB based on the search procedure, estimate a second TO for a second SSB from the base station based on the first TO, and perform a measurement procedure for the second SSB to detect a second beam of the base station based on the second TO.

Another apparatus for wireless communications at a UE is described. The apparatus may include means for performing a search procedure for a first SSB to detect a first beam of a base station, determining a first TO for the first SSB based on the search procedure, estimating a second TO for a second SSB from the base station based on the first TO, and performing a measurement procedure for the second SSB to detect a second beam of the base station based on the second TO.

A non-transitory computer-readable medium storing code for wireless communications at a UE is described. The code may include instructions executable by a processor to perform a search procedure for a first SSB to detect a first beam of a base station, determine a first TO for the first SSB based on the search procedure, estimate a second TO for a second SSB from the base station based on the first TO, and perform a measurement procedure for the second SSB to detect a second beam of the base station based on the second TO.

Some examples of the method, apparatuses, and non-transitory computer-readable medium described herein may further include operations, features, means, or instructions for identifying a subcarrier spacing associated with the first SSB, where the second TO may be estimated based on the subcarrier spacing.

Some examples of the method, apparatuses, and non-transitory computer-readable medium described herein may further include operations, features, means, or instructions for updating the estimated second TO for the second SSB based on performing the measurement procedure for the second SSB.

Some examples of the method, apparatuses, and non-transitory computer-readable medium described herein may further include operations, features, means, or instructions for estimating a third TO for a third SSB from the base station based on the first TO for the first SSB, the estimated second TO for the second SSB, and an SSB pattern, and performing the measurement procedure for the third SSB to detect a third beam of the base station based on the third TO.

Some examples of the method, apparatuses, and non-transitory computer-readable medium described herein may further include operations, features, means, or instructions for performing the measurement procedure for the second SSB from a second base station to detect a third beam of the second base station based on the estimated second TO.

In some examples of the method, apparatuses, and non-transitory computer-readable medium described herein, performing the search procedure for the first SSB further may include operations, features, means, or instructions for determining a RSRP for the first SSB based on a PSS, SSS, and PBCH of the first SSB.

In some examples of the method, apparatuses, and non-transitory computer-readable medium described herein, performing the measurement procedure for the second SSB further may include operations, features, means, or instructions for determining a RSRP for the second SSB based on an SSS of the second SSB.

Some examples of the method, apparatuses, and non-transitory computer-readable medium described herein may further include operations, features, means, or instructions for selecting the second beam of the base station based on the measurement procedure for the second SSB.

Some examples of the method, apparatuses, and non-transitory computer-readable medium described herein may further include operations, features, means, or instructions for selecting a beam of the UE based on the measurement procedure for the second SSB.

A method of wireless communications at a UE is described. The method may include receiving an SSB from a base station, performing a measurement for the SSB as part of a beam detection procedure, determining whether the measurement for the SSB satisfies an SNR threshold, and managing a measurement database (MDB) based on the determining.

An apparatus for wireless communications at a UE is described. The apparatus may include a processor, memory in electronic communication with the processor, and instructions stored in the memory. The instructions may be executable by the processor to cause the apparatus to receive an SSB from a base station, perform a measurement for the SSB as part of a beam detection procedure, determine whether the measurement for the SSB satisfies an SNR threshold, and manage a MDB based on the determining.

Another apparatus for wireless communications at a UE is described. The apparatus may include means for receiving an SSB from a base station, performing a measurement for the SSB as part of a beam detection procedure, determining whether the measurement for the SSB satisfies an SNR threshold, and managing a MDB based on the determining.

A non-transitory computer-readable medium storing code for wireless communications at a UE is described. The code may include instructions executable by a processor to receive an SSB from a base station, perform a measurement for the SSB as part of a beam detection procedure, determine whether the measurement for the SSB satisfies an SNR threshold, and manage a MDB based on the determining.

In some examples of the method, apparatuses, and non-transitory computer-readable medium described herein, performing the measurement for the SSB as part of the beam detection procedure further may include operations, features, means, or instructions for determining a RSRP for the SSB based on an SSS of the SSB.

Some examples of the method, apparatuses, and non-transitory computer-readable medium described herein may further include operations, features, means, or instructions for determining the measurement for the SSB exceeds the SNR threshold and the MDB fails to include a value corresponding to the SSB, and storing the value corresponding to the SSB in the MDB based on the determining.

Some examples of the method, apparatuses, and non-transitory computer-readable medium described herein may further include operations, features, means, or instructions for determining the measurement for the SSB exceeds the SNR threshold and the MDB includes a value corresponding to the SSB, and updating the value corresponding to the SSB based on the determining.

Some examples of the method, apparatuses, and non-transitory computer-readable medium described herein may further include operations, features, means, or instructions for determining the measurement for the SSB fails to exceed the SNR threshold and the MDB fails to include a value corresponding to the SSB, and refraining from modifying the MDB based on the determining.

Some examples of the method, apparatuses, and non-transitory computer-readable medium described herein may further include operations, features, means, or instructions for determining the measurement for the SSB fails to exceed the SNR threshold and the MDB includes a value corresponding to the SSB, identifying a lower value between the value in the MDB and the measurement, and updating the MDB with the lower value based on the identifying.

DETAILED DESCRIPTION

Figure 1:
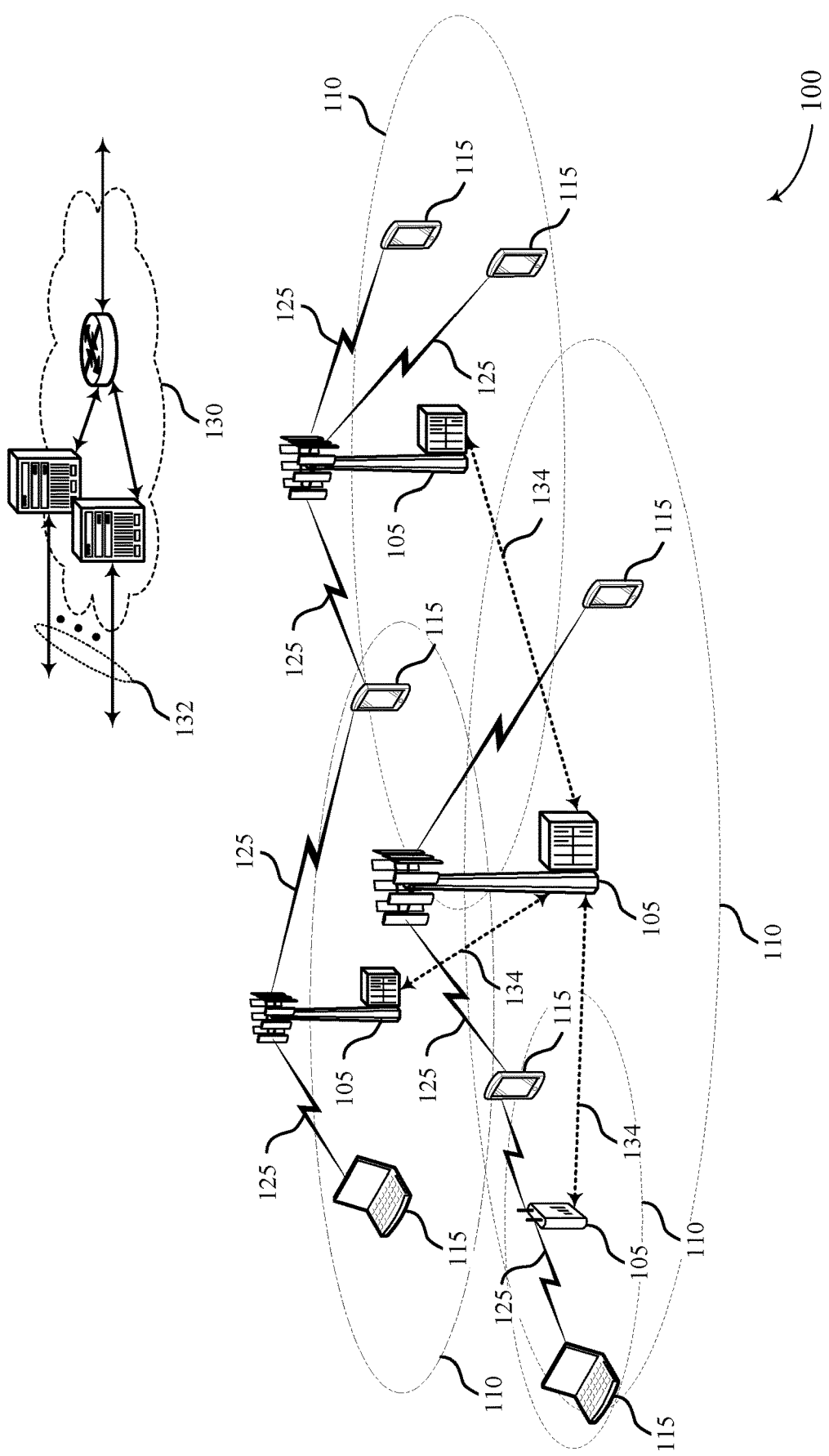
FIG. 1 illustrates an example of a system for wireless communications that supports synchronization signal measurement for beam detection in accordance with aspects of the present disclosure.

A user equipment (UE) and base station may be configured for beamformed transmissions. The base station may periodically transmit synchronization signals, which the UE may monitor for and measure when connecting to the cell. The synchronization signals may be transmitted in a synchronization signal block (SSB). An SSB may be transmitted in an SSB burst, where each SSB of the burst is associated with a different beam. An SSB may include a primary synchronization signal (PSS), a physical broadcast channel (PBCH), and a secondary synchronization signal (SSS).

The UE may perform a search procedure to detect new cells. As part of the search procedure, the UE may measure reference signals in the PSS, PBCH, and SSS of an SSB to receive accurate timing and synchronization information for the cell. The UE may identify a strong beam pair with the base station and connect to the base station using the strong beam pair. Once connected with the cell, the UE may track the status and quality of its established beams with a measurement procedure that measures reference signals in just the SSS of an SSB.

After new cells are detected, the UE may still detect new beams in existing cells. Some UEs may perform a search procedure to detect new beams, but the search procedure may consume a lot of power at the UE. Additionally, when a primary cell and a secondary cell schedule adjacent SSBs, beam switching for a search procedure at the SSB boundary may in some cases experience interference across the adjacent SSBs if the primary cell and the secondary cell are not fully synchronized.

Therefore, to reduce power consumption for beam detection and reduce a likelihood of interference, the UE may use a measurement procedure for beam detection. The measurement procedure, which uses fewer synchronization signals, may result in less power consumption at the UE. There may also be a lower likelihood of interfering symbol overlap when using the measurement procedure based on the measurement procedure spanning fewer symbol periods than the search procedure, which may result in more leniency for beam switching in adjacent SSBs.

The UE may perform a search procedure to detect a first SSB from the base station. The UE may determine a first timing offset (TO) for the first SSB based on the search procedure and use the first TO for the first SSB to estimate other TOs for other SSBs. The UE may use the TOs for the other SSBs to perform measurement procedures. The UE may estimate the other TOs based on a subcarrier spacing configuration or an SSB pattern.

In some cases, a beam detected by a measurement procedure may have a strong reference signal received power (RSRP). However, if the base station beam has a weak signal to noise ratio (SNR), the base station beam may suffer from strong interference. A beam with high RSRP but low SNR may be referred to as a fake beam. Therefore, the UE may implement techniques to distinguish a fake beam from a valid beam, even if the valid beam has a weak signal. The SSS used in the measurement procedure may include some SNR information. The UE may prune fake beams by measuring the SNR of the SSS of the SSB from a cell. The UE may check if the SNR value satisfies a threshold value and determine whether to store the measurements for the SSB of the beam in a measurement database (MDB) based on the determination.

Particular aspects of the subject matter described herein may be implemented to realize one or more advantages. The described techniques may support improvements in system efficiency such that a device may avoid inefficiencies associated with using beams with low SNR (e.g., fake beams) and instead prune beams with SNR values below a threshold value. Examples described herein may also allow a device to switch a beam (e.g., a receive beam) per-SSB during beam detection, resulting in greater flexibility at the device. The described techniques may also save modem power during beam scheduling based on using a search procedure and a measurement procedure at the device as opposed to an all-search procedure.

Aspects of the disclosure are initially described in the context of a wireless communications system. Aspects of the disclosure are further illustrated by and described with reference to apparatus diagrams, system diagrams, and flowcharts that relate to synchronization signal measurement for beam detection.

FIG. 1 illustrates an example of a wireless communications system 100 that supports synchronization signal measurement for beam detection in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may perform a search procedure to detect new cells. As part of the search procedure, the UE 115 may measure reference signals in the PSS, PBCH, and SSS of an SSB to receive accurate timing and synchronization information for the cell. Once connected with the cell, the UE 115 may still detect new beams of the cell. The UE 115 may use a measurement procedure for beam detection. The measurement procedure may use fewer synchronization signals than the search procedure. For example, the measurement procedure may just use the SSS of the SSB instead of the PSS, PBCH, and SSS. The UE 115 may determine a first TO for a first SSB based on a search procedure and use the first TO for the first SSB to estimate other TOs for other SSBs. The UE 115 may use the TOs for the other SSBs to perform measurement procedures.

In some cases, a beam detected by a measurement procedure may have a strong RSRP. However, if the base station beam has a weak SNR, the base station beam may suffer from strong interference. A beam with high RSRP but low SNR may be referred to as a fake beam. Therefore, the UE 115 may implement techniques to distinguish a fake beam from a valid beam, even if the valid beam has a weak signal. For example, the UE 115 may prune fake beams by measuring SNR of an SSS of the measured SSB.

Figure 2:
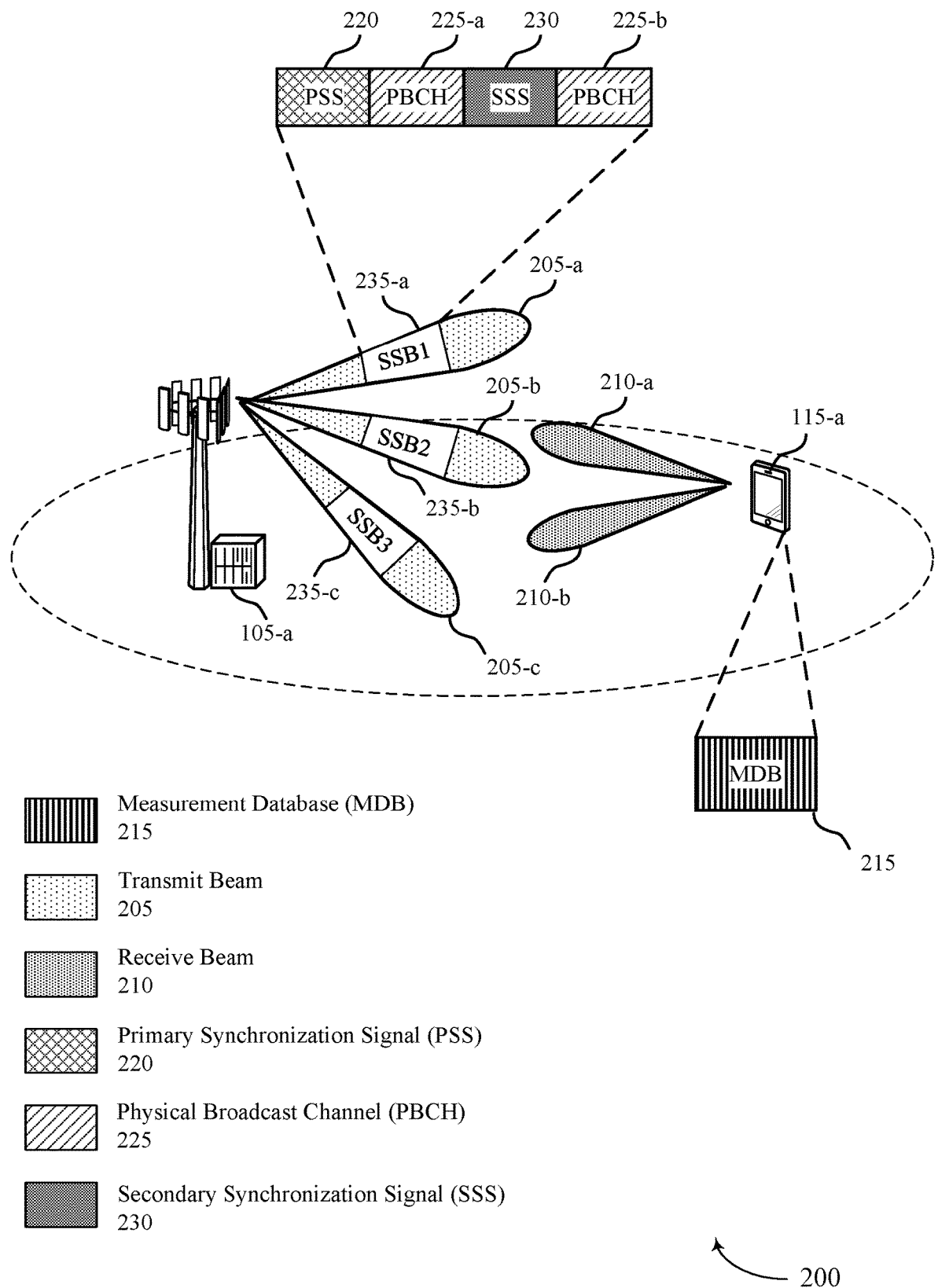
FIG. 2 illustrates an example of a wireless communications system that supports synchronization signal measurement for beam detection in accordance with aspects of the present disclosure.

FIG. 2 illustrates an example of a wireless communications system 200 that supports synchronization signal measurement for beam detection in accordance with aspects of the present disclosure. In some examples, wireless communications system 200 may implement aspects of wireless communications system 100. Wireless communications system 200 may include UE 115-a and base station 105-a, which may be respective examples of a UE 115 and a base station 105 described herein.

Base station 105-a may periodically transmit synchronization signals, which UE 115-a may use when connecting to the cell. The synchronization signals may be transmitted in an SSB 235, including a PSS 220, a PBCH 225 and an SSS 230. In some cases, UE 115-a may perform a search procedure to detect new cells. UE 115-a may measure reference signals in the PSS 220, the PBCH 225, and the SSS 230 for the search procedure to receive accurate timing and synchronization information for the cell. UE 115-a may select a UE beam 210 to receive the SSB 235 and perform the search procedure. In some cases, UE 115-a may perform a measurement procedure to track the signal strength of existing cells. The measurement procedure may measure just the SSS 230 of the SSB 235. UE 115-a may also select a UE beam 210 to perform the measurement procedure.

In some cases, UE 115-a and base station 105-a may be configured for beamforming communications. A UE 115 configured for beamforming communications may also detect new base station beams 205. In some wireless communications systems, the UE 115 may detect new base station beams 205 based on a search procedure and measuring the PSS 220, PBCH 225, and SSS 230 of an SSB 235. Each SSB 235 may be associated with or transmitted on a different base station beam 205. For example, by performing a search procedure for SSB 235-a, the UE 115 may determine beam quality for base station beam 205-a associated with SSB 235-a. However, the search procedure may consume a large amount of power at the UE 115. In some cases, interference between SSBs 235 from different cells may cause interference to the search procedure at the UE 115 if the cells are not synchronized. In some cases, this may occur if two unsynchronized cells, such as a primary cell and a secondary cell, schedule two adjacent SSBs 235. In some cases, when beam switching is done at the search procedure boundary, there may be overlap between the two adjacent non-synchronized SSBs 235 which may lead to the interference. The search procedure may have a large window for possible interference from overlapping SSBs 235 based on the use of three of four signals in an SSB 235, where the three signals used may be the PSS 220, the PBCH 225, and the SSS 230.

To reduce power consumption for beam detection, UE 115-a and other UEs 115 described herein may perform a measurement procedure to detect new base station beams 205. In some cases, the measurement procedure may use less power than the search procedure, as the measurement procedure may measure one synchronization signal (e.g., the SSS 230) of the SSB 235, where the search procedure measures three. There may also be a lower likelihood of symbol overlap when using the measurement procedure, because the measurement procedure may span one symbol period rather than spanning the three symbol periods of the search procedure (e.g., where each signal of the SSB 235 may span a symbol period). In some cases, the measurement procedure may be used for beam detection in cells that have already been detected, such as by a search procedure. The techniques described here may apply to sub-6 GHz wireless communications and mmW communications. Sub-6 SSB may operate in the sub-6 GHz frequency band and mmW SSB may operate at the millimeter wave frequency band.

UE 115-a may perform a search procedure to detect SSB 235-a from base station 105-a, which may be a new cell. A cell and SSB pair may be denoted by an ordered pair, (cell, SSB). In some cases, the value for an SSB 235 in the ordered pair may be based on an SSB index for the SSB 235. For example, base station 105-a may be referred to as cell a, and SSB 235-a may be the first SSB (e.g., SSB 0) of an SSB burst set. The pair, base station 105-a and SSB 235-a, may be denoted by (a, 0). Other cells may be denoted by other letters, where other beams may be denoted by other numbers. For example, a subsequent SSB (e.g., SSB 235-b) from the same cell may be denoted by (a, 1), and a first SSB of a second cell may be denoted by (b, 0).

UE 115-a may determine a TO for a cell and SSB pair. For example, UE 115-a may identify the TO for SSB 235-a from base station 105-a based on performing the search procedure on SSB 235-a. In some cases, the TO may be based on a timing advance of the signals detected by the search procedure. UE 115-a may use the first TO determined by the search procedure to estimate TOs for the rest of the SSBs 235 configured in the same cell. For example, UE 115-a may estimate TOs for SSB 235-b and SSB 235-c based on the TO of SSB 235-a. UE 115-a may use the TOs for the rest of the SSBs 235 to perform measurement procedures for the other SSBs 235.

In some cases, UE 115-a may determine the TOs of the other SSBs 235 based on one or more of a subcarrier spacing configuration or an SSB pattern. For example, some subcarrier spacing configurations may include two SSBs 235 per slot. In this configuration, UE 115-a may determine the TO of (a,0) from the search procedure, add a duration of a slot, and identify an estimated TO of a third SSB 235 (e.g., SSB 235-c), (a,2). Then, the TO of a second SSB 235 (e.g., SSB 235-b) may be determined based on its starting position being between (a,0) and (a,2). Thus, the estimated TO of (a,1) may be equal to (TO of (a, 0)+TO of (a, 2))/2, or half of the sum of TO for (a,0) and the estimated TO for (a,2). After each measurement procedure conducted by UE 115-a on an SSB 235, UE 115-a may update a corresponding estimated TO for the SSB 235. Updating the TO after a measurement procedure may increase the estimation accuracy of the TO. This process may be flexible enough for UE 115-a to use the measurement procedure to detect other SSBs 235 in the newly detected cell by switching beams.

In some cases, a base station beam 205 detected by a measurement procedure may have a strong RSRP. However, if the base station beam 205 has a weak signal to interference and noise ratio (SINR) or SNR, this may mean that the base station beam 205 suffers from strong interference. The base station beam 205 with high RSRP but low SINR may be referred to as a fake beam. In some cases, a UE 115 using the search procedure may use information from multiple reference signals to weed out fake beams. However, a UE 115 using the measurement procedure may not be able to tell that a base station beam 205 is fake, because the UE 115 may not be able to rely on the PBCH to screen out the fake beams. Thus, a UE 115 may implement techniques to distinguish a fake beam from a valid weak beam, even in an environment where it's difficult to distinguish, such as an additive white Gaussian noise (AWGN) channel.

UE 115-a may implement SINR pruning techniques to avoid fake beam selection when using the measurement procedure for beam detection. The SSS 230 that may be used by UE 115-a in the measurement procedure may include some SINR information. The pruning mechanism may include measuring the SINR of the SSS 230 included in an SSB 235 from a cell (e.g., corresponding to a cell/SSB 235 pair denoted by (cell, SSB)). In some cases, the SINR measurement may be referred to as SSS_SINR. UE 115-*a* may check if the SINR measurement satisfies a threshold value and manage a MDB 215 based on the determination.

In some cases, the SINR measurement may satisfy the threshold. If the SINR does satisfy the threshold, UE 115-*a* may check if the (cell, SSB) pair is already in the MDB 215. For example, if SSB 235-*b* has an SINR which is greater than a threshold, UE 115-*a* may check if SSB 235-*a* from base station 105-*a* is in the MDB 215. If it is not, UE 115-*a* may store the (cell, SSB) pair in the MDB 215. For example, UE 115-*a* may store the RSRP measurement for SSB 235-*b* from base station 105-*a* in the MDB 215 if the corresponding SINR measurement exceeds the threshold and the MDB 215 does not already include a value for SSB 235-*b* from base station 105-*a*. If the (cell, SSB) pair is already in the MDB 215, then UE 115-*a* may update one or more of the RSRP, reference signal received quality (RSRQ), or SINR measurement values in the MDB 215 for the (cell, SSB) pair. For example, if the SINR for SSB 235-*b* exceeds the threshold, and the MDB 215 already has a value for the RSRP of SSB 235-*b* from base station 105-*a*, UE 115-*a* may update the RSRP value for SSB 235-*b* from base station 105-*a* in the MDB 215. In some cases, UE 115-*a* may update or store one or more of the RSRP measurement, and RSRQ measurement, or the SINR measurement in the MDB 215 based on the SINR measurement exceeding the threshold.

In other cases, the SINR measurement may not satisfy the threshold. In these cases, UE 115-*a* may check if the (cell, SSB) pair is in the MDB 215. If the (cell, SSB) set is in the MDB 215, then UE 115-*a* may update one or more of the RSRP, RSRQ, and SINR measurement values for that (cell, SSB) pair in the MDB 215. For example, UE 115-*a* may update the MDB 215 based on a lower value between the recent RSRP measurement and the RSRP measurement stored in the MDB 215. If the (cell, SSB) pair is not in the database, then UE 115-*a* may ignore the (cell, SSB 235) pair and may not store the (cell, SSB 235) set in the MDB 215.

In an example, UE 115-*a* may perform a measurement procedure on SSB 235-*b* from base station 105-*a*. The RSRP of SSB 235-*b* may be strong, but the SINR associated with SSB 235-*b* may not exceed the SINR threshold. UE 115-*a* may check whether the MDB 215 includes a value for SSB 235-*b* from base station 105-*a*. If the MDB does include a value, UE 115-*a* may check which of the RSRP values is lower between the stored RSRP and the recently measured RSRP. UE 115-*a* may store the lower of the RSRP values in the MDB 215. For example, if the recently measured RSRP value is lower, UE 115-*a* may replace the RSRP value for SSB 235-*b* from base station 105-*a* in the MDB 215 with the recently measured RSRP. If the stored value is higher, UE 115-*a* may not change the RSRP value for SSB 235-*b* from base station 105-*a* in the MDB 215. If the SINR associated with SSB 235-*b* from base station 105-*a* is lower than the threshold and there is no RSRP value for SSB 235-*b* from base station 105-*a* stored in the MDB 215, UE 115-*a* may ignore the recent measurement for the SSB and not update the MDB 215.

In some cases, UE 115-*a* may begin the pruning mechanism by measuring the SNR instead and may use similar pruning mechanism thereafter with the SNR measurement (e.g., SSS_SNR) instead of an SINR measurement.

Figure 3A:
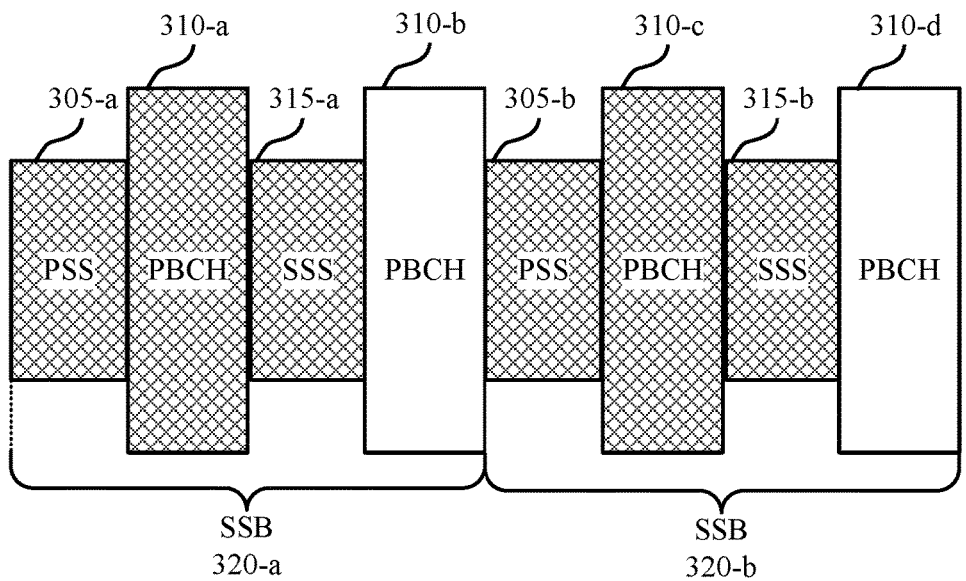
FIGS. 3A and 3B illustrate respective examples of a search procedure configuration and a measurement procedure configuration that support synchronization signal measurement for beam detection in accordance with aspects of the present disclosure.
Figure 3B:
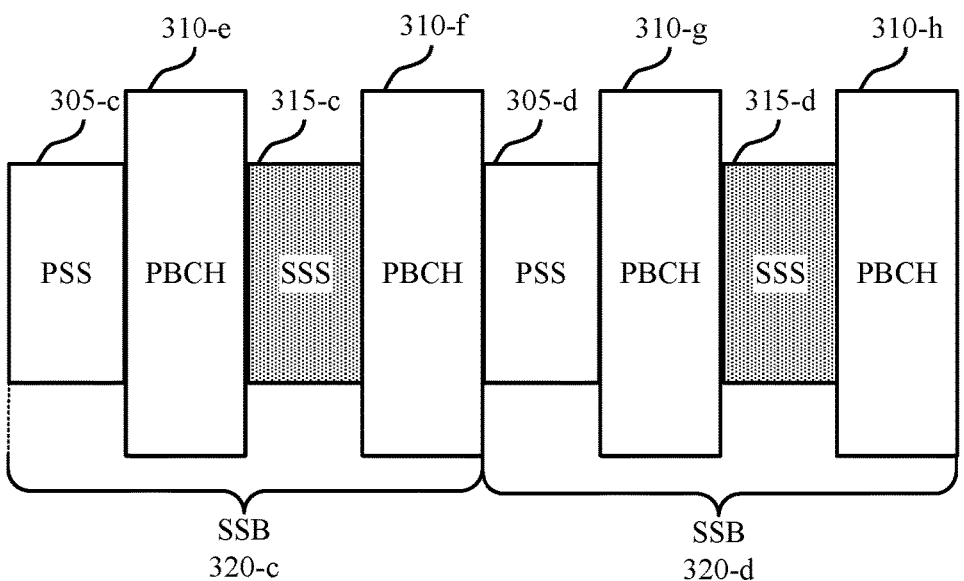

FIGS. 3A and 3B illustrate respective examples of a search procedure configuration 300 and a measurement procedure configuration 301 that support synchronization signal measurement for beam detection in accordance with aspects of the present disclosure. In some examples, the search procedure configuration 300 and the measurement procedure configuration 301 may implement aspects of wireless communications system 100.

The search procedure configuration 300 may show the signals that are used for a search procedure. An SSB 320 may include a PSS 305, a first and second PBCH 310, and an SSS 315. For example, SSB 320-*a* may include PSS 305-*a*, PBCH 310-*a*, SSS 315-*a*, and PBCH 310-*b*. SSB 320-*b* may include PSS 305-*b*, PBCH 310-*c*, SSS 315-*b* and PBCH 310-*d*. A search procedure may measure reference signals included in an SSB 320 to check cell quality and acquire time and frequency synchronization with a cell. A UE 115 may use a PSS 305, one PBCH 310, and an SSS 315 to conduct a search procedure for an SSB 320.

The search procedure may use a large amount of power. In some cases, interference between SSBs 320 from different cells may cause interference to the search procedure at the UE 115 if the cells are not synchronized. In some cases, interference may occur if two unsynchronized cells schedule two adjacent SSBs 320. The search procedure may have a large window for interference from overlapping SSBs 320, based on its use of three of the four signals in an SSB 320. When beam switching is done at the search procedure boundary, there may be overlap between two adjacent nonsynchronized SSBs 320.

The measurement procedure configuration 301 may show signals that are used for the measurement procedure. SSB 320-*c* may include PSS 305-*c*, PBCH 310-*e*, SSS 315-*c*, and PBCH 310-*f*. SSB 320-*d* may include PSS 305-*d*, PBCH 310-*g*, SSS 315-*d*, and PBCH 310-*h*. A UE 115 may use an SSS 315 of an SSB 320 to perform a measurement procedure. For example, the UE 115 may use SSS 315-*c* to perform a measurement procedure for SSB 320-*c*, and the UE 115 may use SSS 315-*d* to conduct a measurement procedure for SSB 320-*d*.

The UE 115 may use the measurement procedure to track existing beams as well as to detect new beams using techniques described herein. The measurement procedure may use less power than the search procedure based on using a third as many signals. Additionally, the measurement procedure may result in less interference when switching at the measurement procedure boundary. For example, there may be less possible overlap between two adjacent nonsynchronized SSBs 320 based on the measurement procedure using one out of the four signals in an SSB 320, rather than the three signals used by the search procedure.

Figure 4:
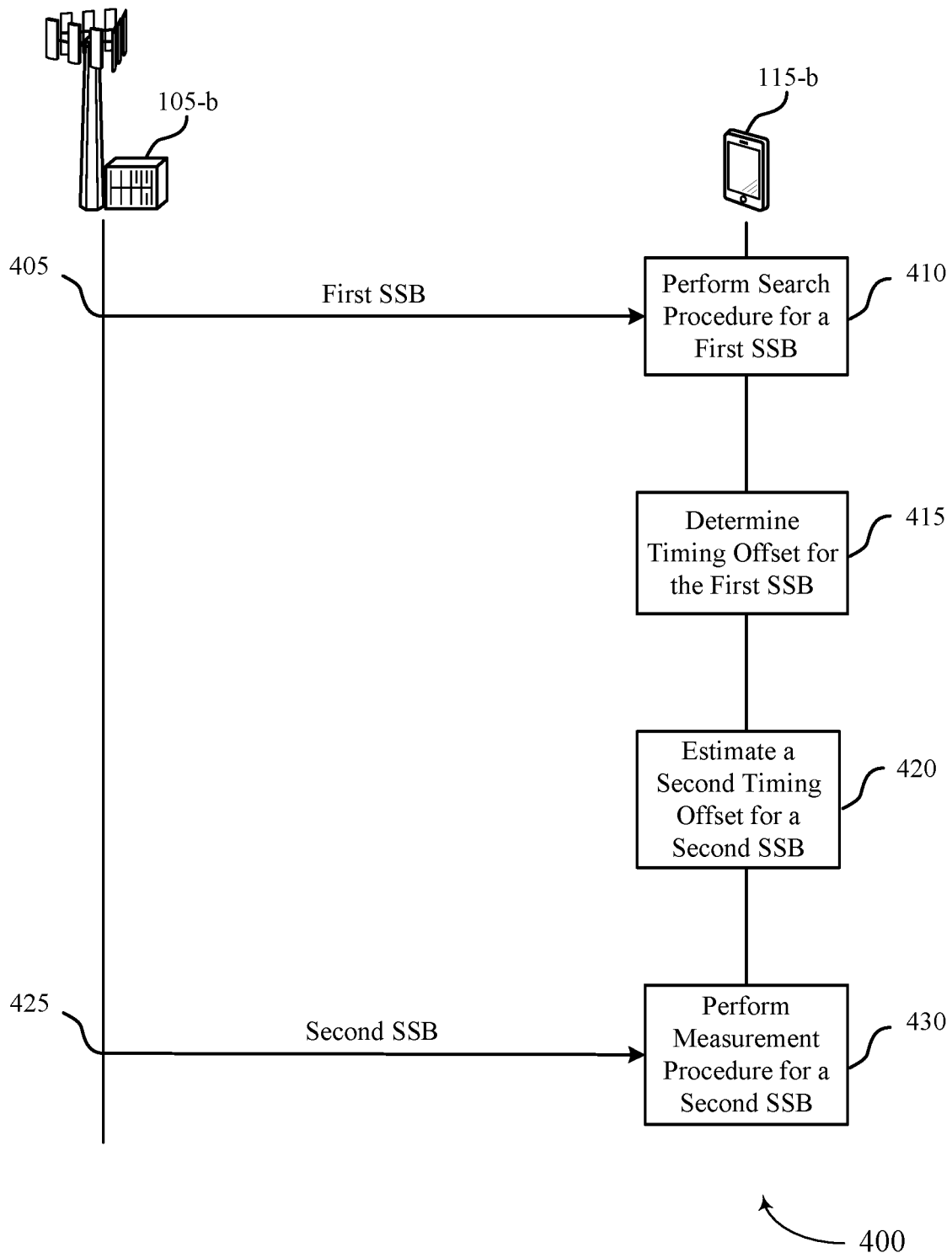
FIG. 4 illustrates an example of a process flow that supports synchronization signal measurement for beam detection in accordance with aspects of the present disclosure.

FIG. 4 illustrates an example of a process flow 400 that supports synchronization signal measurement for beam detection in accordance with aspects of the present disclosure. In some examples, process flow 400 may implement aspects of wireless communications system 100. Process flow 400 may include UE 115-*a* and base station 105-*a*, which may be respective examples of a UE 115 and a base station 105 described herein.

At 405, base station 105-*b* may transmit a first SSB to UE 115-*b*. In some cases, the first SSB may include a PSS, an SSS, and two PBCH signals. UE 115-*b* may perform a search procedure at 410 for the first SSB to detect a first beam of base station 105-*a*. The first SSB may correspond to a first beam of base station 105-*b*. In some cases, performing the search procedure may include determining an RSRP for the first SSB based on the PSS, the SSS, and the PBCH of the SSB. For example, UE 115-*b* may use three signals of the four signals included in the SSB for the search procedure. In some cases, the cell (e.g., base station 105-*b*)

and the first SSB may be denoted as a set (cell, SSB number). For example, the first SSB from base station 105-*b* may be denoted by (a, 0), where base station 105-*a* is cell a and the first SSB may be SSB 0.

At 415, UE 115-*b* may determine a first TO for the first SSB based on the search procedure. The TO for the first SSB may be denoted (a,0), and may be determined by adding a duration of a slot and identifying an estimated TO of a third SSB, which may be denoted as (a,2).

At 420, the UE 115-*b* may estimate a second TO for a second SSB from base station 105-*b* based on the first TO. In some cases, UE 115-*b* may identify a subcarrier spacing associated with the SSB, and the second TO may be based on the subcarrier spacing. In some cases, UE 115-*b* may estimate a third TO for a third SSB from the base station based on the first TO for the first SSB, the estimated TO for the second SSB, and an SSB pattern. For example, the estimated TO for the second SSB may be (a,2). If there are two SSBs per slot, the TO for the second SSB may be estimated by adding a duration of a slot to the TO for (a,0). The third SSB may be denoted as (a,1) and may be between the first SSB and the second SSB in the SSB burst set. The estimated TO of (a,1) may be equal to (TO of (a, 0)+TO of (a, 2))/2, or half of the sum of TO for (a,0) and the estimated TO for (a,2).

At 425, base station 105-*b* may transmit a second SSB based on the SSB periodicity. In some cases, the second SSB may be transmitted in a later SSB burst set. For example, the second SSB may be transmitted in an SSB burst set 20 ms, or a multiple of 20 ms, after the SSB burst set which includes the first SSB transmitted at 405. At 430, UE 115-*b* may perform a measurement procedure for the second SSB to detect a second beam of base station 105-*b* based on the second TO. Performing the measurement procedure for the second SSB may include determining an RSRP for the second SSB based on an SSS of the second SSB. In some cases, UE 115-*b* may perform a measurement procedure for SSB n in existing cells (e.g., not detected by a search procedure) based on the estimated TO of SSB n in existing cells. For example, UE 115-*b* may perform the measurement procedure for the second SSB (e.g., an SSB with the SSB index of the second SSB received from base station 105-*b* at 425) from a second base station 105 (not shown) to detect a third beam of the second base station 105 based on the estimated second TO.

After each measurement procedure conducted by the UE 115, the UE 115 may update the estimated second TO for the second SSB based on performing the measurement procedure for the second SSB. Updating the TO after each measurement procedure may increase the estimation accuracy of the TO. The UE 115 may be able to use the measurement procedure to detect other SSBs in a newly detected cell by switching beams.

Figure 5:
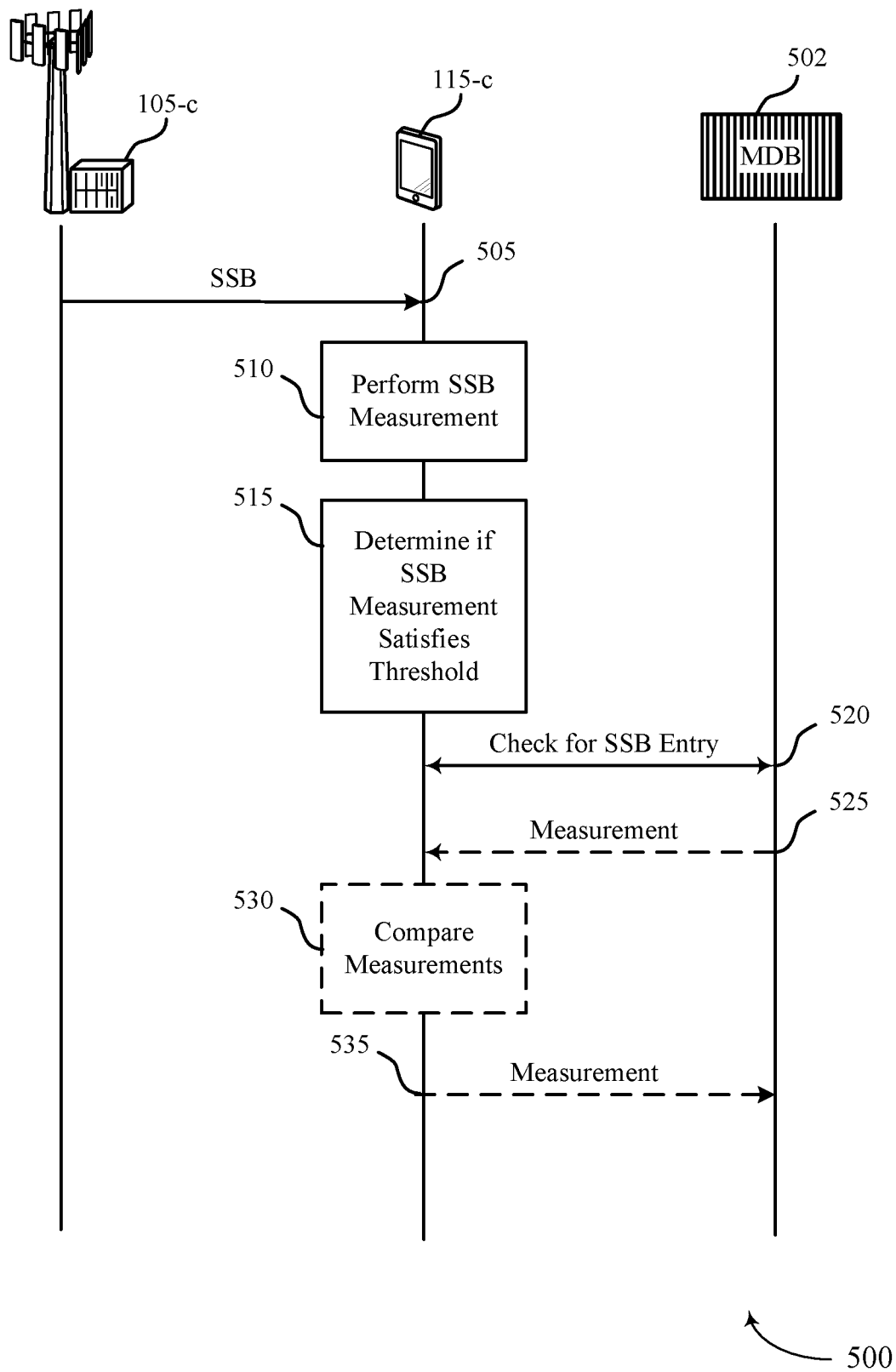
FIG. 5 illustrates an example of a process flow that supports synchronization signal measurement for beam detection in accordance with aspects of the present disclosure.

FIG. 5 illustrates an example of a process flow 500 that supports synchronization signal measurement for beam detection in accordance with aspects of the present disclosure. In some examples, process flow 500 may implement aspects of wireless communications system 100. Process flow 500 may include base station 105-*c* and UE 115-*c*, which may be respective examples of a base station 105 and a UE 115 described herein. The process flow 500 may also include an MDB 502, which may be an example of an MDB 215 described in FIG. 2.

At 505, UE 115-*c* may receive an SSB from base station 105-*c*. At 510, UE 115-*c* may perform a measurement for the SSB as part of the beam detection procedure. In some cases, a beam detected by a measurement procedure may have a strong RSRP. However, if the beam has a weak SINR, this may mean that the beam suffers from strong interference. Beams with high RSRP but low SINR may be referred to as fake beams. In some cases, the search procedure may use information from multiple reference signals to weed out fake beams. Therefore, UE 115-*c* may implement SINR pruning techniques to avoid fake beam selection during the measurement procedure.

The SSS may still include some SINR information. In some cases, the fake beam pruning techniques may include measuring the SINR of the SSS of a received SSB from a cell (e.g., base station 105-*c*). In some cases, the SINR measurement may be referred to as SSS_SINR. UE 115-*c* may determine whether measurements for the SSB satisfy the SINR threshold at 515 and whether the MDB 502 includes a value for the SSB at 520. UE 115-*c* may accordingly manage a MDB based on the determining.

In some cases, UE 115-*c* may determine that the measurement for the SSB satisfies the SINR threshold at 515 and determine that the MDB 502 fails to include a value corresponding to the SSB at 520. At 535, UE 115-*c* may store the value corresponding to the SSB in the MDB 502 based on the determining. The value that UE 115-*c* updates in the MDB 502 may be one or more of the RSRP, RSRQ, or SINR of the SSB.

In some cases, UE 115-*c* may determine that the measurement for the SSB satisfies the SINR threshold at 515 and determine that the MDB 502 includes a value corresponding the to the SSB at 520. At 535, UE 115-*c* may update the value corresponding to the SSB in MDB 502 based on the determining. The value that UE 115-*c* updates in the MDB 502 may be one or more of the RSRP, RSRQ, or SINR.

In some cases, UE 115-*c* may also determine that the measurement for the SSB does not satisfy the SINR threshold at 515 and determine that the MDB 502 does include a value corresponding the to the SSB at 520. UE 115-*c* may identify the lower value between the value in the MDB 502 and the measurement. UE 115-*c* may retrieve the measurement stored in the MDB 502 at 525 and compare the measurements at 530. At 535, UE 115-*c* may update the value corresponding to the SSB in MDB 502 based at least in part on determining the lower value between the measurements. The value that UE 115-*c* updates in the database may be one or more of the RSRP, RSRQ, or SINR.

In some cases, UE 115-*c* may determine that the measurement for the SSB does not satisfy the SINR threshold at 515 and determine that the MDB 502 does not include a value corresponding the to the SSB at 520. If the measurement for the SSB does not satisfy the SINR threshold and the MDB 502 does not include a value corresponding to the SSB, UE 115-*c* may refrain from modifying the MDB 502.

In other cases, the UE 115 may begin the pruning mechanism by measuring the SNR instead and may continue the same pruning mechanism thereafter with the SNR measurement (e.g., SSS_SNR) instead of SINR measurement.

Figure 6:
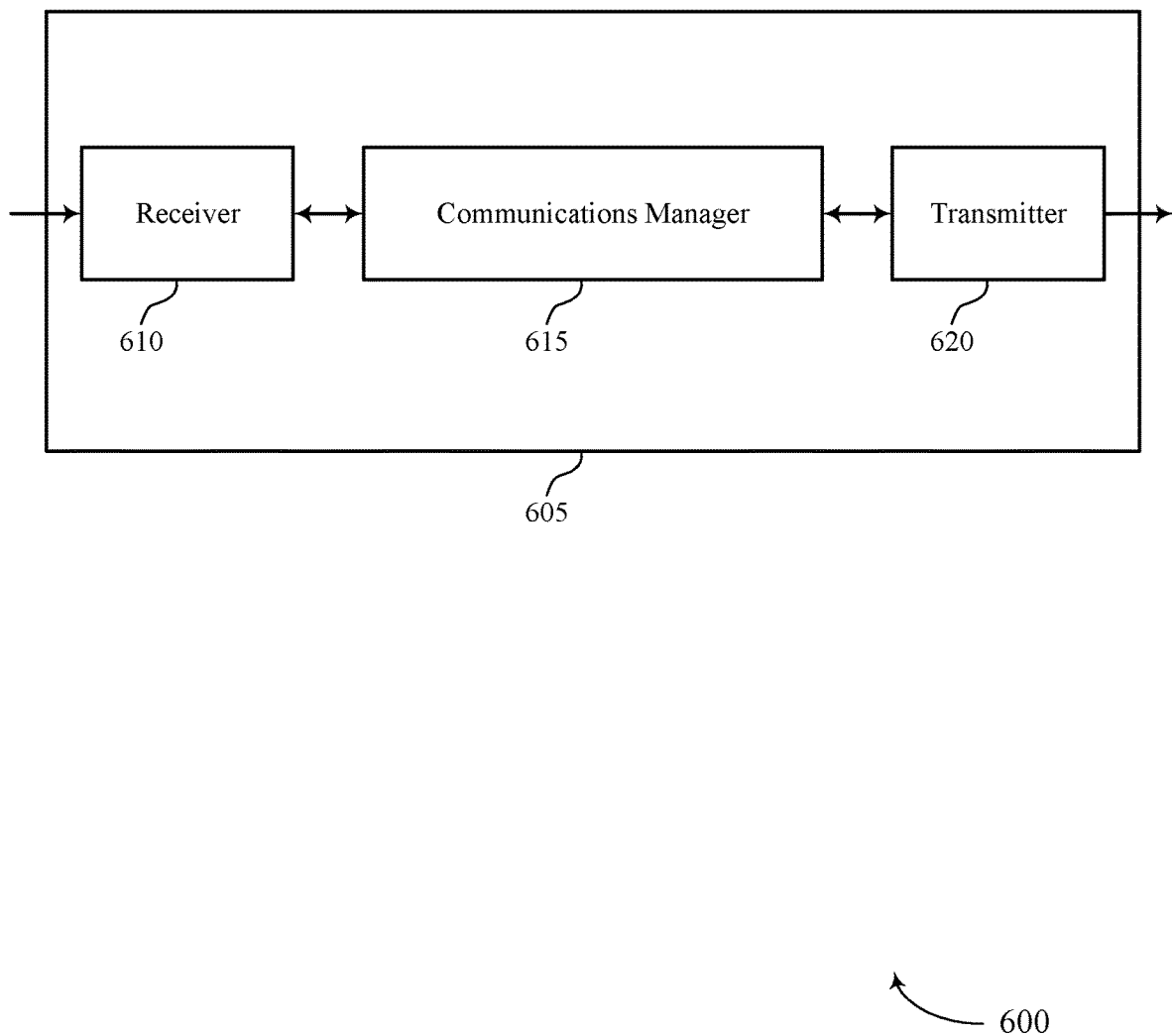
FIGS. 6 and 7 show block diagrams of devices that support synchronization signal measurement for beam detection in accordance with aspects of the present disclosure.

FIG. 6 shows a block diagram 600 of a device 605 that supports synchronization signal measurement for beam detection in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to synchronization signal measurement for beam detection, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may perform a search procedure for a first synchronization signal block to detect a first beam of a base station, determine a first timing offset for the first synchronization signal block based on the search procedure, estimate a second timing offset for a second synchronization signal block from the base station based on the first timing offset, and perform a measurement procedure for the second synchronization signal block to detect a second beam of the base station based on the second timing offset. The communications manager 615 may also receive a synchronization signal block from a base station, perform a measurement for the synchronization signal block as part of a beam detection procedure, determine whether the measurement for the synchronization signal block satisfies a signal to noise ratio threshold, and manage a measurement database based on the determining. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The communications manager 615 as described herein may be implemented to realize one or more potential advantages. One implementation may allow the UE 115 to save power and increase battery life by using a combination of a search procedure and a measurement procedure, instead of an all-search procedure. Another implementation may allow the UE 115 to prune beams with low SNR values, such that the UE 115 may avoid inefficiencies associated with using beams with low SNR values.

Based on techniques for efficiently communicating using a combination of a search procedure and a measurement procedure in addition to using beams with SNR values above a threshold value, a processor of the UE 115 (e.g., controlling the receiver 610, the transmitter 620, or a transceiver 920 as described with reference to FIG. 9) may increase system efficiency and decrease unnecessary processing at the UE 115.

Figure 7:
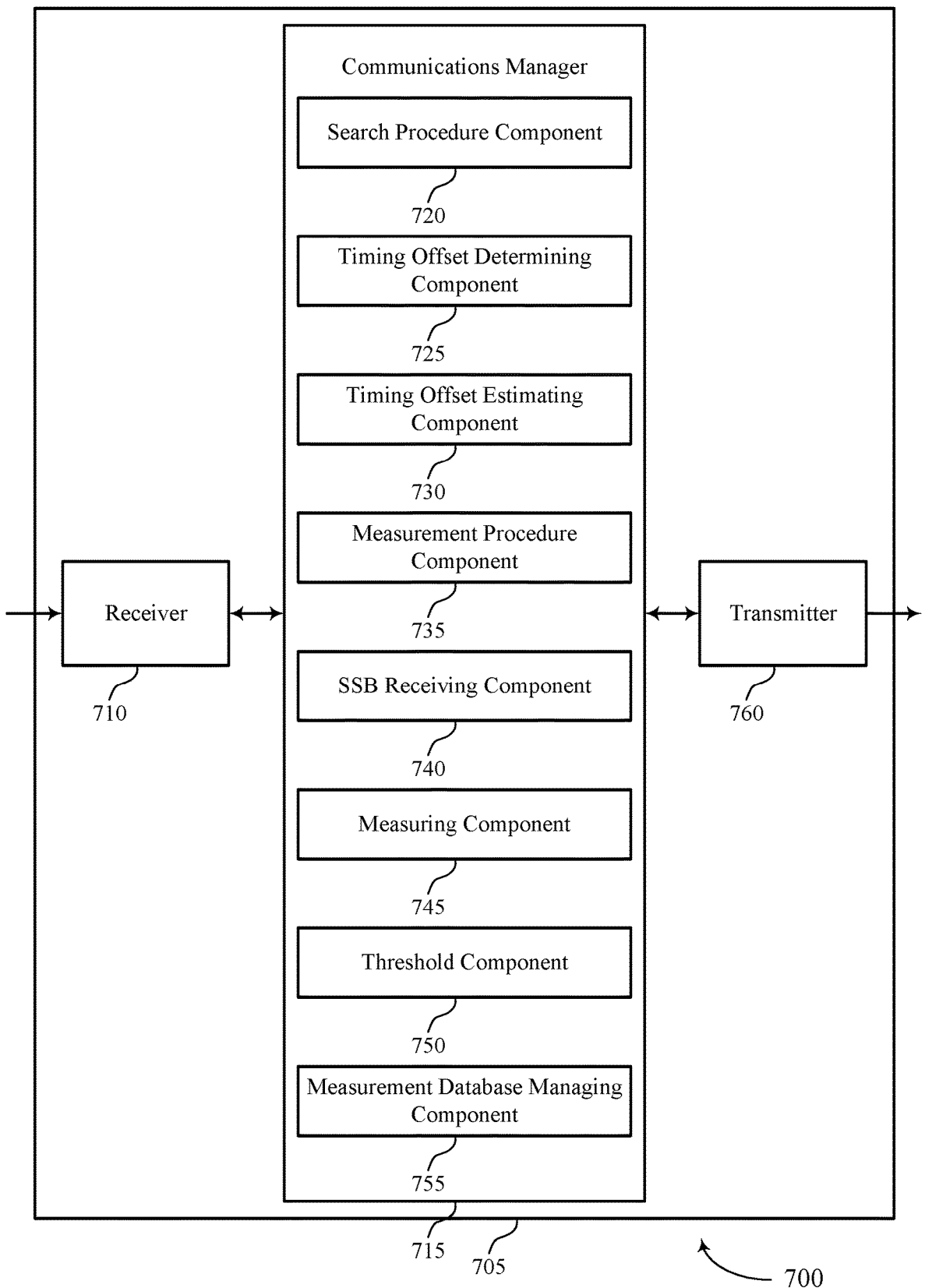

FIG. 7 shows a block diagram 700 of a device 705 that supports synchronization signal measurement for beam detection in accordance with aspects of the present disclosure. The device 705 may be an example of aspects of a device 605, or a UE 115 as described herein. The device 705 may include a receiver 710, a communications manager 715, and a transmitter 760. The device 705 may also include a processor. Each of these components may be in communication with one another (e.g., via one or more buses).

The receiver 710 may receive information such as packets, user data, or control information associated with various information channels (e.g., control channels, data channels, and information related to synchronization signal measurement for beam detection, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a search procedure component 720, a timing offset determining component 725, a timing offset estimating component 730, a measurement procedure component 735, an SSB receiving component 740, a measuring component 745, a threshold component 750, and a measurement database managing component 755. The communications manager 715 may be an example of aspects of the communications manager 910 described herein.

The search procedure component 720 may perform a search procedure for a first synchronization signal block to detect a first beam of a base station. The timing offset determining component 725 may determine a first timing offset for the first synchronization signal block based on the search procedure. The timing offset estimating component 730 may estimate a second timing offset for a second synchronization signal block from the base station based on the first timing offset. The measurement procedure component 735 may perform a measurement procedure for the second synchronization signal block to detect a second beam of the base station based on the second timing offset.

The SSB receiving component 740 may receive a synchronization signal block from a base station. The measuring component 745 may perform a measurement for the synchronization signal block as part of a beam detection procedure. The threshold component 750 may determine whether the measurement for the synchronization signal block satisfies a signal to noise ratio threshold. The measurement database managing component 755 may manage a measurement database based on the determining.

The transmitter 760 may transmit signals generated by other components of the device 705. In some examples, the transmitter 760 may be collocated with a receiver 710 in a transceiver module. For example, the transmitter 760 may be an example of aspects of the transceiver 920 described with reference to FIG. 9. The transmitter 760 may utilize a single antenna or a set of antennas.

Figure 8:
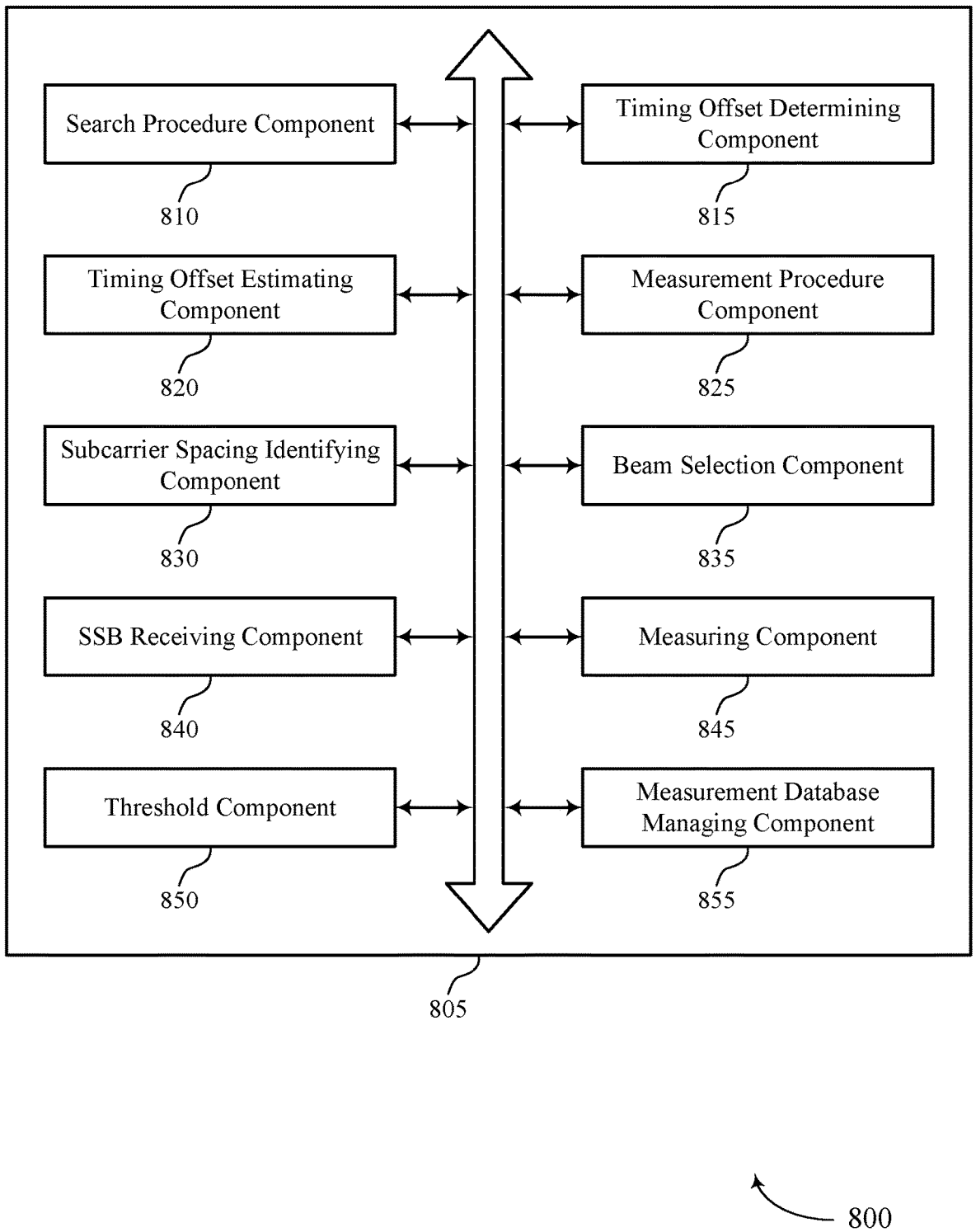
FIG. 8 shows a block diagram of a communications manager that supports synchronization signal measurement for beam detection in accordance with aspects of the present disclosure.

FIG. 8 shows a block diagram 800 of a communications manager 805 that supports synchronization signal measurement for beam detection in accordance with aspects of the present disclosure. The communications manager 805 may be an example of aspects of a communications manager 615, a communications manager 715, or a communications manager 910 described herein. The communications manager 805 may include a search procedure component 810, a timing offset determining component 815, a timing offset estimating component 820, a measurement procedure component 825, a subcarrier spacing identifying component 830, a beam selection component 835, an SSB receiving component 840, a measuring component 845, a threshold component 850, and a measurement database managing component 855. Each of these modules may communicate, directly or indirectly, with one another (e.g., via one or more buses).

The search procedure component 810 may perform a search procedure for a first synchronization signal block to detect a first beam of a base station. In some examples, the search procedure component 810 may determine an RSRP for the first synchronization signal block based on a primary synchronization signal, secondary synchronization signal, and physical broadcast channel of the first synchronization signal block. The timing offset determining component 815 may determine a first timing offset for the first synchronization signal block based on the search procedure.

The timing offset estimating component 820 may estimate a second timing offset for a second synchronization signal block from the base station based on the first timing offset. In some examples, the timing offset estimating component 820 may update the estimated second timing offset for the second synchronization signal block based on performing the measurement procedure for the second synchronization signal block. In some examples, the timing offset estimating component 820 may estimate a third timing offset for a third synchronization signal block from the base station based on the first timing offset for the first synchronization signal block, the estimated second timing offset for the second synchronization signal block, and a synchronization signal block pattern.

The measurement procedure component 825 may perform a measurement procedure for the second synchronization signal block to detect a second beam of the base station based on the second timing offset. In some examples, the measurement procedure component 825 may perform the measurement procedure for the third synchronization signal block to detect a third beam of the base station based on the third timing offset. In some examples, the measurement procedure component 825 may determine an RSRP for the second synchronization signal block based on a secondary synchronization signal of the second synchronization signal block.

The measurement procedure component 825 may perform the measurement procedure for the second synchronization signal block from a second base station to detect a third beam of the second base station based on the estimated second timing offset.

The SSB receiving component 840 may receive a synchronization signal block from a base station. The measuring component 845 may perform a measurement for the synchronization signal block as part of a beam detection procedure. In some examples, the measuring component 845 may determine an RSRP for the synchronization signal block based on a secondary synchronization signal of the synchronization signal block.

The threshold component 850 may determine whether the measurement for the synchronization signal block satisfies a signal to noise ratio threshold. In some examples, the threshold component 850 may determine the measurement for the synchronization signal block exceeds the signal to noise ratio threshold and the measurement database fails to include a value corresponding to the synchronization signal block. In some examples, the threshold component 850 may determine the measurement for the synchronization signal block exceeds the signal to noise ratio threshold and the measurement database includes a value corresponding to the synchronization signal block.

In some examples, the threshold component 850 may determine the measurement for the synchronization signal block fails to exceed the signal to noise ratio threshold and the measurement database fails to include a value corresponding to the synchronization signal block. In some examples, the threshold component 850 may determine the measurement for the synchronization signal block fails to exceed the signal to noise ratio threshold and the measurement database includes a value corresponding to the synchronization signal block.

The measurement database managing component 855 may manage a measurement database based on the determining. In some examples, the measurement database managing component 855 may store the value corresponding to the synchronization signal block in the measurement database based on determining the measurement for the synchronization signal block exceeds the signal to noise ratio threshold and the measurement database fails to include a value corresponding to the synchronization signal block. In some examples, the measurement database managing component 855 may update the value corresponding to the synchronization signal block based on determining the measurement for the synchronization signal block exceeds the signal to noise ratio threshold and the measurement database includes a value corresponding to the synchronization signal block. In some examples, the measurement database managing component 855 may refrain from modifying the measurement database based on determining the measurement for the synchronization signal block fails to exceed the signal to noise ratio threshold and the measurement database fails to include a value corresponding to the synchronization signal block.

In some examples, the measurement database managing component 855 may identify a lower value between the value in the measurement database and the measurement. In some examples, the measurement database managing component 855 may update the measurement database with the lower value based on the identifying.

The subcarrier spacing identifying component 830 may identify a subcarrier spacing associated with the first synchronization signal block, where the second timing offset is estimated based on the subcarrier spacing. The beam selection component 835 may select the second beam of the base station based on the measurement procedure for the second synchronization signal block. In some examples, the beam selection component 835 may select a beam of the UE based on the measurement procedure for the second synchronization signal block.

Figure 9:
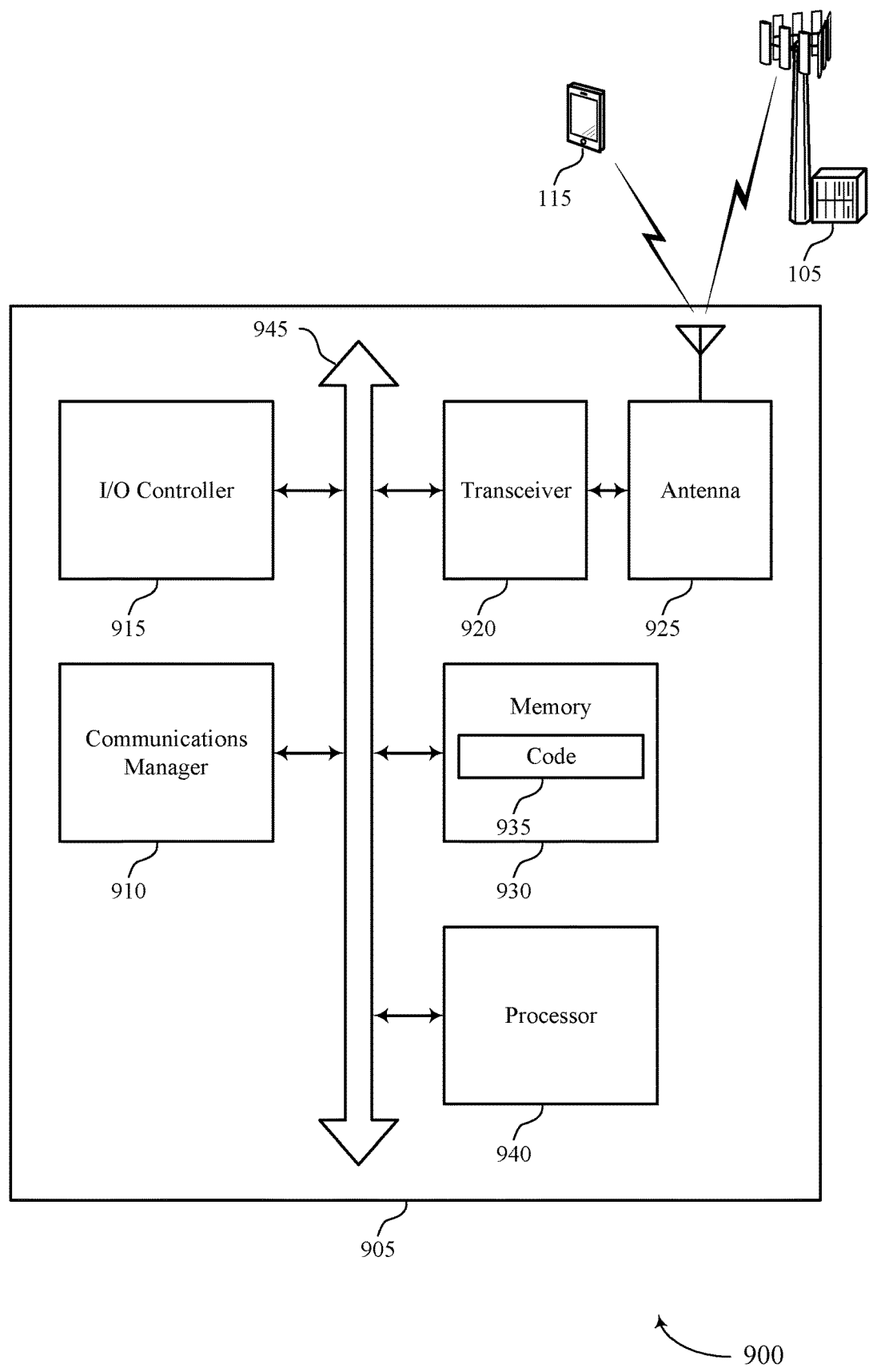
FIG. 9 shows a diagram of a system including a device that supports synchronization signal measurement for beam detection in accordance with aspects of the present disclosure.

FIG. 9 shows a diagram of a system 900 including a device 905 that supports synchronization signal measurement for beam detection in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may perform a search procedure for a first synchronization signal block to detect a first beam of a base station, determine a first timing offset for the first synchronization signal block based on the search procedure, estimate a second timing offset for a second synchronization signal block from the base station based on the first timing offset, and perform a measurement procedure for the second synchronization signal block to detect a second beam of the base station based on the second timing offset. The communications manager 910 may also receive a synchronization signal block from a base station, perform a measurement for the synchronization signal block as part of a beam detection procedure, determine whether the measurement for the synchronization signal block satisfies a signal to noise ratio threshold, and manage a measurement database based on the determining.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting synchronization signal measurement for beam detection).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Based on using a combination of a search procedure and a measurement procedure, the processor 940 of a UE 115 may more efficiently receive SSBs (e.g., adjacent SSBs from two different cells). Further, the processor 940 of the UE 115 may switch a beam (e.g., a receive beam) per-SSB during beam detection such that the UE 115 may have greater flexibility in its beam selection. In some examples, greater flexibility at the UE 115 may allow the UE 115 to more efficiently allocate its processing power. Additionally, the processor 940 of the UE 115 may prune beams with SNR values below a threshold value, saving processing power that may otherwise be used for such beams.

Figure 10:
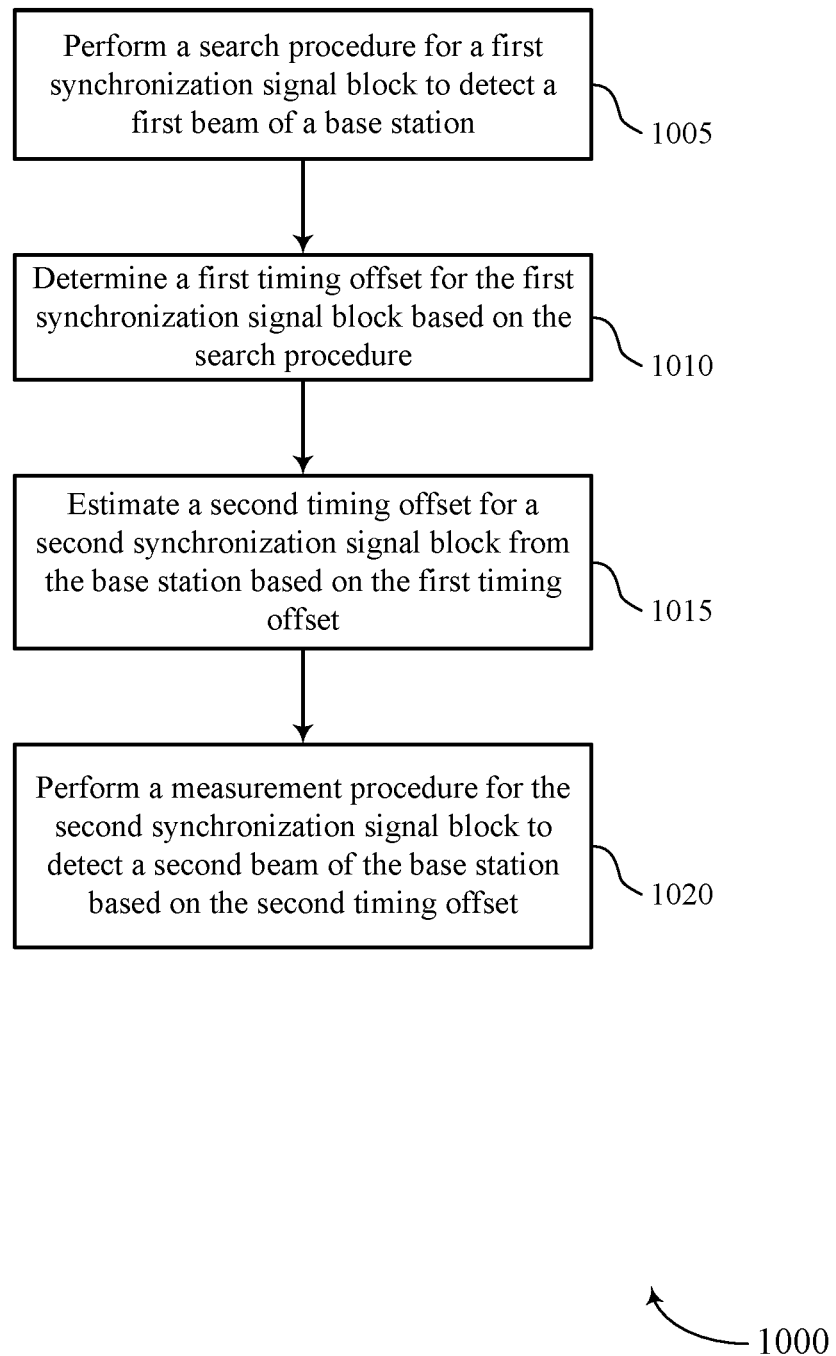
FIGS. 10 through 14 show flowcharts illustrating methods that support synchronization signal measurement for beam detection in accordance with aspects of the present disclosure.

FIG. 10 shows a flowchart illustrating a method 1000 that supports synchronization signal measurement for beam detection in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may perform a search procedure for a first synchronization signal block to detect a first beam of a base station. The operations of 1005 may be performed according to the methods described herein. In some examples, aspects of the operations of 1005 may be performed by a search procedure component as described with reference to FIGS. 6 through 9.

At 1010, the UE may determine a first timing offset for the first synchronization signal block based on the search procedure. The operations of 1010 may be performed according to the methods described herein. In some examples, aspects of the operations of 1010 may be performed by a timing offset determining component as described with reference to FIGS. 6 through 9.

At 1015, the UE may estimate a second timing offset for a second synchronization signal block from the base station based on the first timing offset. The operations of 1015 may be performed according to the methods described herein. In some examples, aspects of the operations of 1015 may be performed by a timing offset estimating component as described with reference to FIGS. 6 through 9.

At 1020, the UE may perform a measurement procedure for the second synchronization signal block to detect a second beam of the base station based on the second timing offset. The operations of 1020 may be performed according to the methods described herein. In some examples, aspects of the operations of 1020 may be performed by a measurement procedure component as described with reference to FIGS. 6 through 9.

Figure 11:
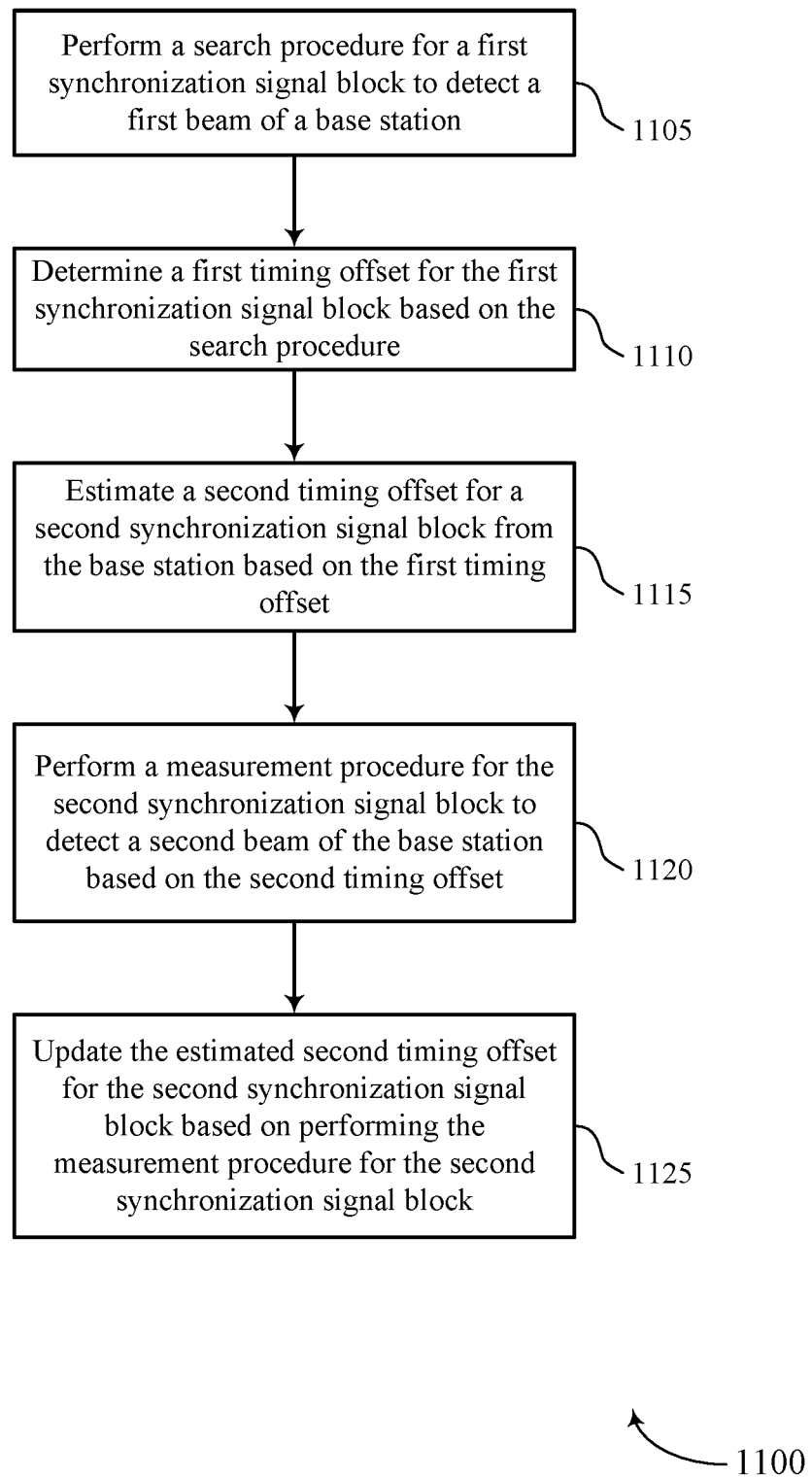

FIG. 11 shows a flowchart illustrating a method 1100 that supports synchronization signal measurement for beam detection in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may perform a search procedure for a first synchronization signal block to detect a first beam of a base station. The operations of 1105 may be performed according to the methods described herein. In some examples, aspects of the operations of 1105 may be performed by a search procedure component as described with reference to FIGS. 6 through 9.

At 1110, the UE may determine a first timing offset for the first synchronization signal block based on the search procedure. The operations of 1110 may be performed according to the methods described herein. In some examples, aspects of the operations of 1110 may be performed by a timing offset determining component as described with reference to FIGS. 6 through 9.

At 1115, the UE may estimate a second timing offset for a second synchronization signal block from the base station based on the first timing offset. The operations of 1115 may be performed according to the methods described herein. In some examples, aspects of the operations of 1115 may be performed by a timing offset estimating component as described with reference to FIGS. 6 through 9.

At 1120, the UE may perform a measurement procedure for the second synchronization signal block to detect a second beam of the base station based on the second timing offset. The operations of 1120 may be performed according to the methods described herein. In some examples, aspects of the operations of 1120 may be performed by a measurement procedure component as described with reference to FIGS. 6 through 9.

At 1125, the UE may update the estimated second timing offset for the second synchronization signal block based on performing the measurement procedure for the second synchronization signal block. The operations of 1125 may be performed according to the methods described herein. In some examples, aspects of the operations of 1125 may be performed by a timing offset estimating component as described with reference to FIGS. 6 through 9.

Figure 12:
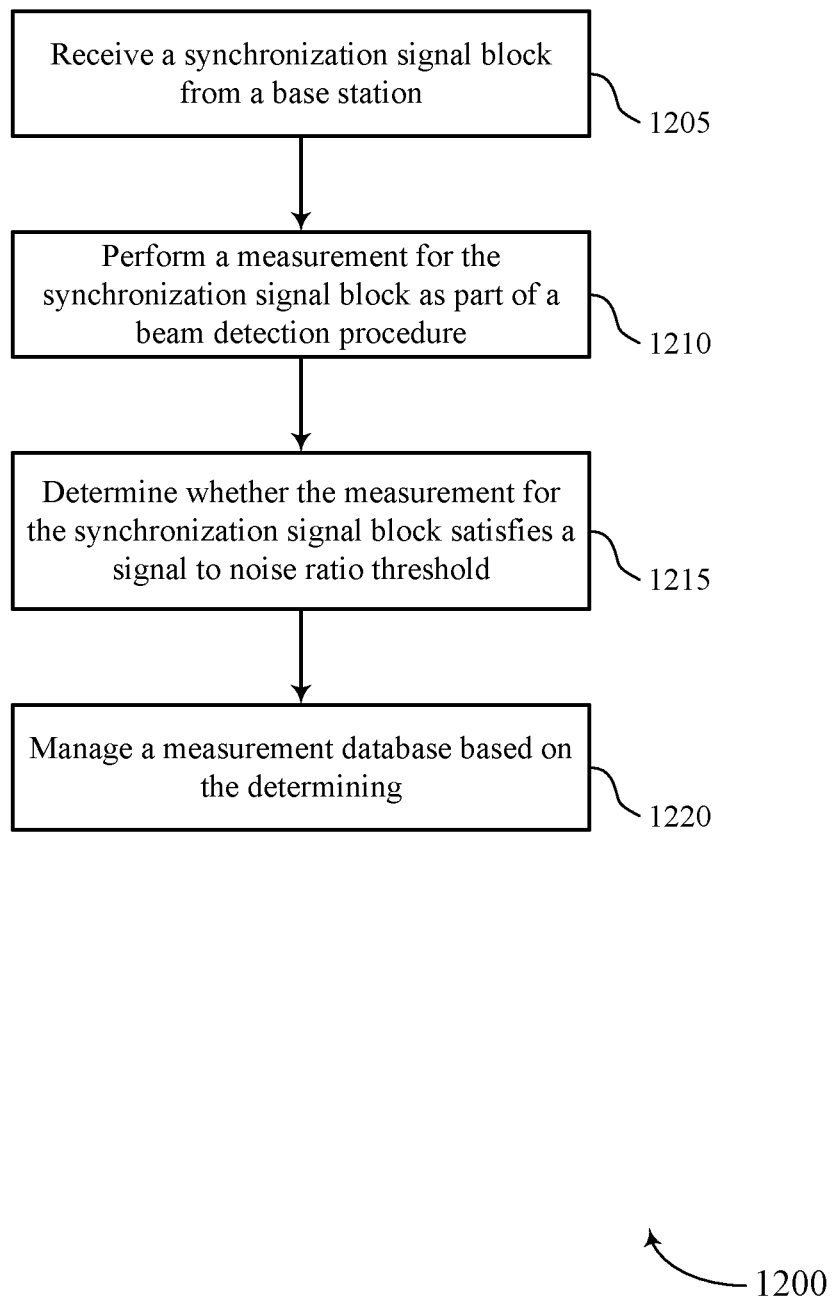

FIG. 12 shows a flowchart illustrating a method 1200 that supports synchronization signal measurement for beam detection in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may receive a synchronization signal block from a base station. The operations of 1205 may be performed according to the methods described herein. In some examples, aspects of the operations of 1205 may be performed by an SSB receiving component as described with reference to FIGS. 6 through 9.

At 1210, the UE may perform a measurement for the synchronization signal block as part of a beam detection procedure. The operations of 1210 may be performed according to the methods described herein. In some examples, aspects of the operations of 1210 may be performed by a measuring component as described with reference to FIGS. 6 through 9.

At 1215, the UE may determine whether the measurement for the synchronization signal block satisfies a signal to noise ratio threshold. The operations of 1215 may be performed according to the methods described herein. In some examples, aspects of the operations of 1215 may be performed by a threshold component as described with reference to FIGS. 6 through 9.

At 1220, the UE may manage a measurement database based on the determining. The operations of 1220 may be performed according to the methods described herein. In some examples, aspects of the operations of 1220 may be performed by a measurement database managing component as described with reference to FIGS. 6 through 9.

Figure 13:
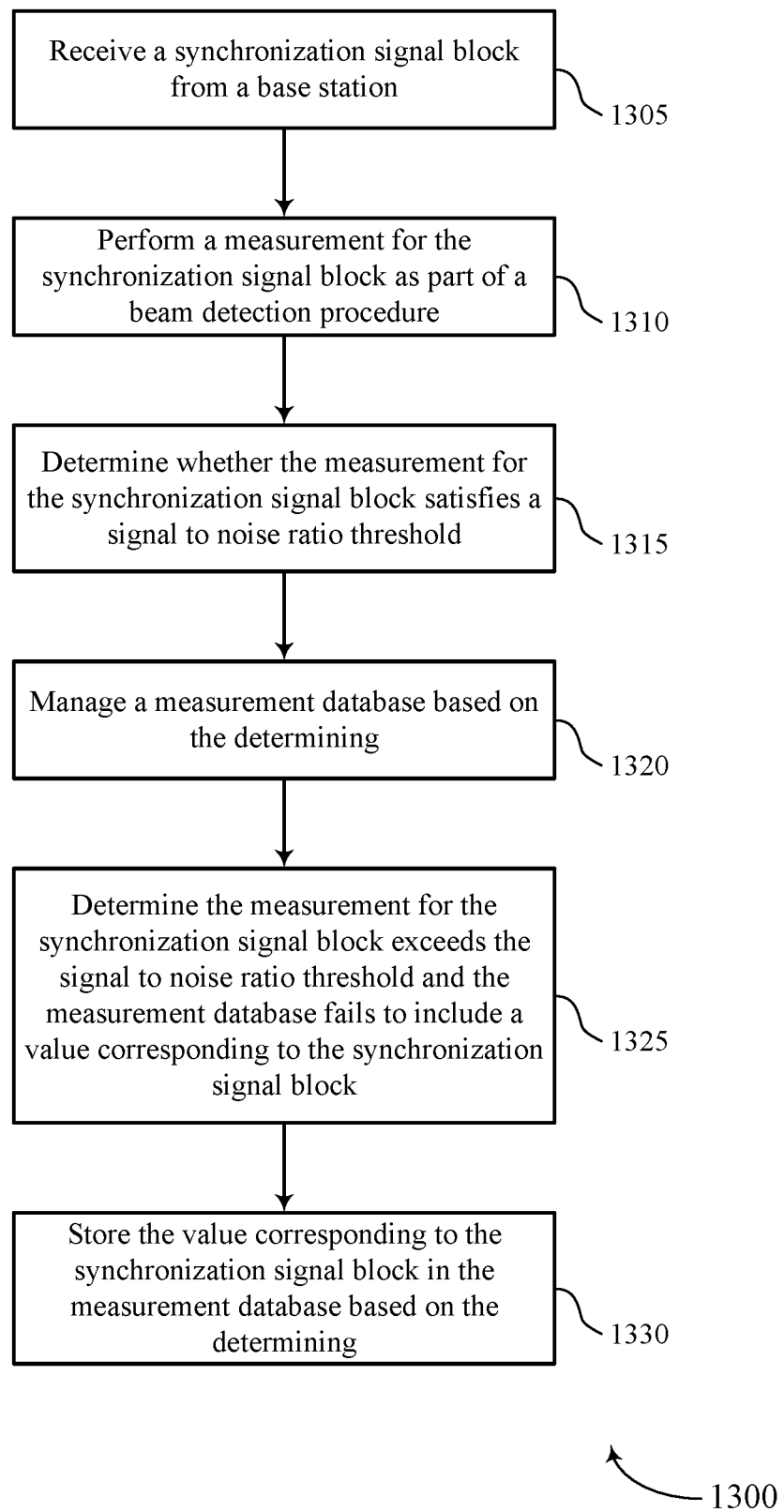

FIG. 13 shows a flowchart illustrating a method 1300 that supports synchronization signal measurement for beam detection in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE may receive a synchronization signal block from a base station. The operations of 1305 may be performed according to the methods described herein. In some examples, aspects of the operations of 1305 may be performed by an SSB receiving component as described with reference to FIGS. 6 through 9.

At 1310, the UE may perform a measurement for the synchronization signal block as part of a beam detection procedure. The operations of 1310 may be performed according to the methods described herein. In some examples, aspects of the operations of 1310 may be performed by a measuring component as described with reference to FIGS. 6 through 9.

At 1315, the UE may determine whether the measurement for the synchronization signal block satisfies a signal to noise ratio threshold. The operations of 1315 may be performed according to the methods described herein. In some examples, aspects of the operations of 1315 may be performed by a threshold component as described with reference to FIGS. 6 through 9.

The UE may manage a measurement database based on the determining. For example, at 1320 the UE may determine that the measurement for the synchronization signal block exceeds the signal to noise ratio threshold and the measurement database fails to include a value corresponding to the synchronization signal block. The operations of 1320 may be performed according to the methods described herein. In some examples, aspects of the operations of 1320 may be performed by a threshold component as described with reference to FIGS. 6 through 9.

At 1325, the UE may store the value corresponding to the synchronization signal block in the measurement database based on the determining. The operations of 1325 may be performed according to the methods described herein. In some examples, aspects of the operations of 1325 may be performed by a measurement database managing component as described with reference to FIGS. 6 through 9.

Figure 14:
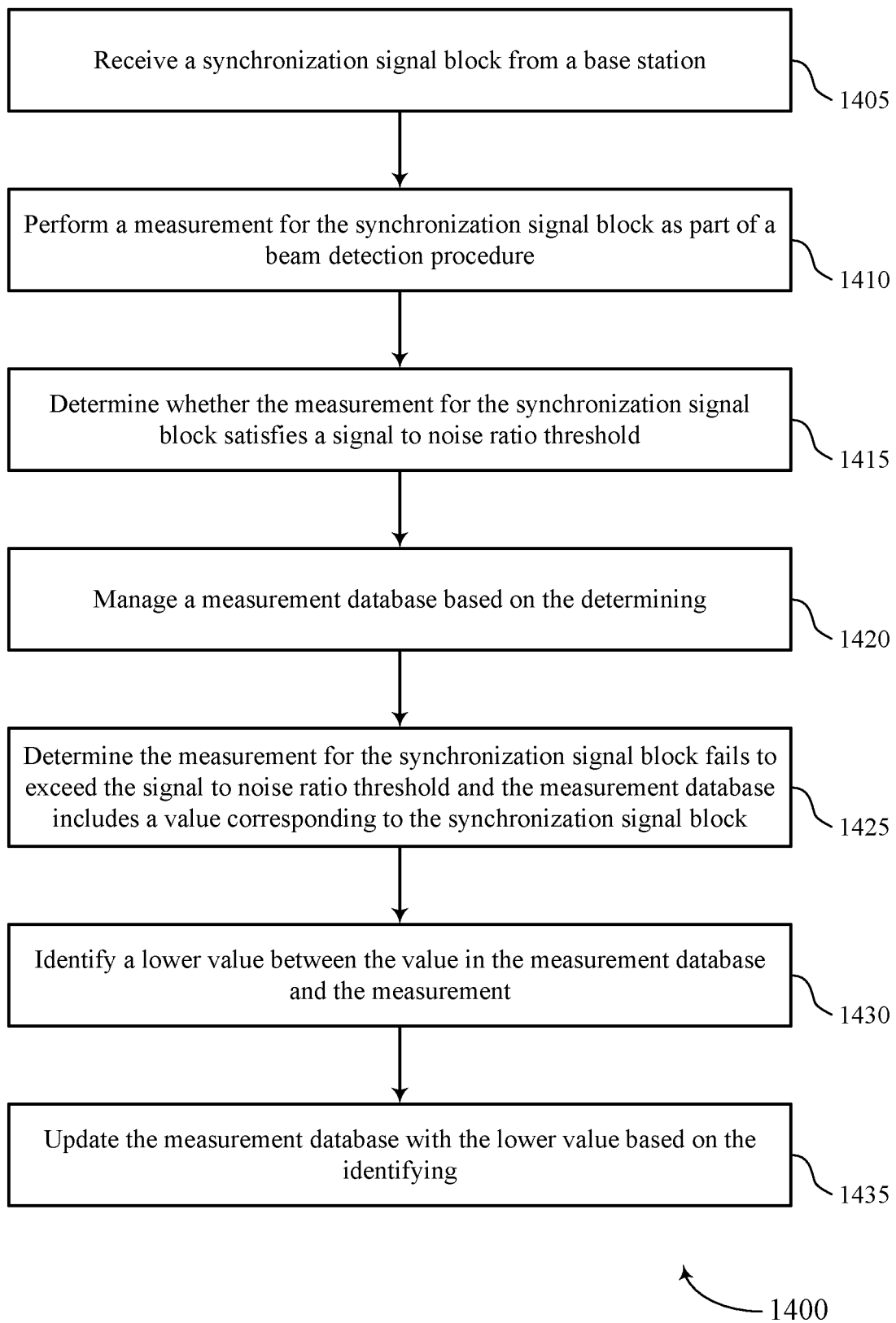

FIG. 14 shows a flowchart illustrating a method 1400 that supports synchronization signal measurement for beam detection in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a synchronization signal block from a base station. The operations of 1405 may be performed according to the methods described herein. In some examples, aspects of the operations of 1405 may be performed by an SSB receiving component as described with reference to FIGS. 6 through 9.

At 1410, the UE may perform a measurement for the synchronization signal block as part of a beam detection procedure. The operations of 1410 may be performed according to the methods described herein. In some examples, aspects of the operations of 1410 may be performed by a measuring component as described with reference to FIGS. 6 through 9.

At 1415, the UE may determine whether the measurement for the synchronization signal block satisfies a signal to noise ratio threshold. The operations of 1415 may be performed according to the methods described herein. In some examples, aspects of the operations of 1415 may be performed by a threshold component as described with reference to FIGS. 6 through 9.

The UE may manage a measurement database based on the determining. For example, at 1420 the UE may determine that the measurement for the synchronization signal block fails to exceed the signal to noise ratio threshold and the measurement database includes a value corresponding to the synchronization signal block. The operations of 1420 may be performed according to the methods described herein. In some examples, aspects of the operations of 1420 may be performed by a threshold component as described with reference to FIGS. 6 through 9.

At 1425, the UE may identify a lower value between the value in the measurement database and the measurement. The operations of 1425 may be performed according to the methods described herein. In some examples, aspects of the operations of 1425 may be performed by a measurement database managing component as described with reference to FIGS. 6 through 9.

At 1430, the UE may update the measurement database with the lower value based on the identifying. The operations of 1430 may be performed according to the methods described herein. In some examples, aspects of the operations of 1430 may be performed by a measurement database managing component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    performing a search procedure for a first synchronization signal block to detect a first beam of a base station;
    determining a first timing offset for the first synchronization signal block based at least in part on the search procedure;
    estimating a second timing offset for a second synchronization signal block from the base station based at least in part on the first timing offset; and
    performing a measurement procedure for the second synchronization signal block to detect a second beam of the base station based at least in part on the second timing offset.

2. The method of claim 1, further comprising:
    identifying a subcarrier spacing associated with the first synchronization signal block, wherein the second timing offset is estimated based at least in part on the subcarrier spacing.

3. The method of claim 1, further comprising:
    updating the estimated second timing offset for the second synchronization signal block based at least in part on performing the measurement procedure for the second synchronization signal block.

4. The method of claim 1, further comprising:
    estimating a third timing offset for a third synchronization signal block from the base station based at least in part on the first timing offset for the first synchronization signal block, the estimated second timing offset for the second synchronization signal block, and a synchronization signal block pattern; and performing the measurement procedure for the third synchronization signal block to detect a third beam of the base station based at least in part on the third timing offset.

5. The method of claim 1, wherein the base station is a first base station, further comprising:
performing the measurement procedure for the second synchronization signal block from a second base station to detect a third beam of the second base station based at least in part on the estimated second timing offset.

6. The method of claim 1, wherein performing the search procedure for the first synchronization signal block further comprises:
determining a reference signal received power (RSRP) for the first synchronization signal block based at least in part on a primary synchronization signal, secondary synchronization signal, and physical broadcast channel of the first synchronization signal block.

7. The method of claim 1, wherein performing the measurement procedure for the second synchronization signal block further comprises:
determining a reference signal received power (RSRP) for the second synchronization signal block based at least in part on a secondary synchronization signal of the second synchronization signal block.

8. The method of claim 1, further comprising:
selecting the second beam of the base station based at least in part on the measurement procedure for the second synchronization signal block.

9. The method of claim 1, further comprising:
selecting a beam of the UE based at least in part on the measurement procedure for the second synchronization signal block.

10. An apparatus for wireless communications at a user equipment (UE), comprising:
a processor,
memory in electronic communication with the processor; and
instructions stored in the memory and executable by the processor to cause the apparatus to:
perform a search procedure for a first synchronization signal block to detect a first beam of a base station;
determine a first timing offset for the first synchronization signal block based at least in part on the search procedure;
estimate a second timing offset for a second synchronization signal block from the base station based at least in part on the first timing offset; and
perform a measurement procedure for the second synchronization signal block to detect a second beam of the base station based at least in part on the second timing offset.

11. The apparatus of claim 10, wherein the instructions are further executable by the processor to cause the apparatus to:
identify a subcarrier spacing associated with the first synchronization signal block, wherein the second timing offset is estimated based at least in part on the subcarrier spacing.

12. The apparatus of claim 10, wherein the instructions are further executable by the processor to cause the apparatus to:
update the estimated second timing offset for the second synchronization signal block based at least in part on performing the measurement procedure for the second synchronization signal block.

13. The apparatus of claim 10, wherein the instructions are further executable by the processor to cause the apparatus to:
estimate a third timing offset for a third synchronization signal block from the base station based at least in part on the first timing offset for the first synchronization signal block, the estimated second timing offset for the second synchronization signal block, and a synchronization signal block pattern; and
perform the measurement procedure for the third synchronization signal block to detect a third beam of the base station based at least in part on the third timing offset.

14. The apparatus of claim 10, wherein the base station is a first base station, the instructions further executable by the processor to cause the apparatus to:
perform the measurement procedure for the second synchronization signal block from a second base station to detect a third beam of the second base station based at least in part on the estimated second timing offset.

15. The apparatus of claim 10, wherein the instructions to perform the search procedure for the first synchronization signal block further are executable by the processor to cause the apparatus to:
determine a reference signal received power (RSRP) for the first synchronization signal block based at least in part on a primary synchronization signal, secondary synchronization signal, and physical broadcast channel of the first synchronization signal block.

16. The apparatus of claim 10, wherein the instructions to perform the measurement procedure for the second synchronization signal block further are executable by the processor to cause the apparatus to:
determine a reference signal received power (RSRP) for the second synchronization signal block based at least in part on a secondary synchronization signal of the second synchronization signal block.

17. The apparatus of claim 10, wherein the instructions are further executable by the processor to cause the apparatus to:
select the second beam of the base station based at least in part on the measurement procedure for the second synchronization signal block.

18. The apparatus of claim 10, wherein the instructions are further executable by the processor to cause the apparatus to:
select a beam of the UE based at least in part on the measurement procedure for the second synchronization signal block.

19. An apparatus for wireless communications at a user equipment (UE), comprising:
means for performing a search procedure for a first synchronization signal block to detect a first beam of a base station;
means for determining a first timing offset for the first synchronization signal block based at least in part on the search procedure;
means for estimating a second timing offset for a second synchronization signal block from the base station based at least in part on the first timing offset; and
means for performing a measurement procedure for the second synchronization signal block to detect a second beam of the base station based at least in part on the second timing offset.

20. The apparatus of claim 19, further comprising:
means for identifying a subcarrier spacing associated with the first synchronization signal block, wherein the second timing offset is estimated based at least in part on the subcarrier spacing.

21. The apparatus of claim 19, further comprising:
means for updating the estimated second timing offset for the second synchronization signal block based at least in part on performing the measurement procedure for the second synchronization signal block.

22. The apparatus of claim 19, further comprising:
means for estimating a third timing offset for a third synchronization signal block from the base station based at least in part on the first timing offset for the first synchronization signal block, the estimated second timing offset for the second synchronization signal block, and a synchronization signal block pattern; and
means for performing the measurement procedure for the third synchronization signal block to detect a third beam of the base station based at least in part on the third timing offset.

23. The apparatus of claim 19, further comprising:
means for performing the measurement procedure for the second synchronization signal block from a second base station to detect a third beam of the second base station based at least in part on the estimated second timing offset.

24. The apparatus of claim 19, further comprising:
means for determining a reference signal received power (RSRP) for the first synchronization signal block based at least in part on a primary synchronization signal, secondary synchronization signal, and physical broadcast channel of the first synchronization signal block.

25. The method of claim 19, further comprising:
means for selecting the second beam of the base station based at least in part on the measurement procedure for the second synchronization signal block.

26. The method of claim 19, further comprising:
means for selecting a beam of the UE based at least in part on the measurement procedure for the second synchronization signal block.

* * * * *